(12) United States Patent
Wakashima

(10) Patent No.: US 11,257,619 B2
(45) Date of Patent: Feb. 22, 2022

(54) MULTILAYER CERAMIC CAPACITOR AND METHOD OF MANUFACTURING THE SAME

(71) Applicant: Murata Manufacturing Co., Ltd., Nagaokakyo (JP)

(72) Inventor: Masahiro Wakashima, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 196 days.

(21) Appl. No.: 16/549,088

(22) Filed: Aug. 23, 2019

(65) Prior Publication Data
US 2019/0385793 A1 Dec. 19, 2019

Related U.S. Application Data

(63) Continuation of application No. PCT/JP2018/008142, filed on Mar. 2, 2018.

(30) Foreign Application Priority Data

Mar. 3, 2017 (JP) .............................. JP2017-040991
Mar. 3, 2017 (JP) .............................. JP2017-040992

(51) Int. Cl.
*H01G 4/012* (2006.01)
*H01G 4/232* (2006.01)
(Continued)

(52) U.S. Cl.
CPC ........... *H01G 4/012* (2013.01); *H01G 4/2325* (2013.01); *H01G 4/30* (2013.01); *H01G 4/1227* (2013.01); *H01G 4/1236* (2013.01)

(58) Field of Classification Search
CPC ...... H01G 4/30; H01G 4/1227; H01G 4/2325; H01G 4/005; H01G 4/012
(Continued)

(56) References Cited

U.S. PATENT DOCUMENTS

2004/0027787 A1 2/2004 Yamauchi et al.
2013/0050899 A1 2/2013 Kim et al.
(Continued)

FOREIGN PATENT DOCUMENTS

JP 2000-124064 A 4/2000
JP 2004-228514 A 8/2004
(Continued)

OTHER PUBLICATIONS

Official Communication issued in International Patent Application No. PCT/JP2018/008142, dated May 29, 2018.

*Primary Examiner* — Arun Ramaswamy

(57) ABSTRACT

A multilayer ceramic capacitor includes a laminated body including dielectric layers and internal electrode layers alternately laminated in a width direction, and first and second external electrodes on a bottom surface of the laminated body. Among ridges located on a side of an upper surface of the laminated body of an inner layer generating capacitance, a ridge located on the side of a first end surface is a first ridge, and a ridge located on the side of a second end surface is a second ridge. When r1 is a curvature radius of the first ridge at a central position in the width direction of the laminated body, and r2 is a curvature radius of the second ridge at the central position in the width direction of the laminated body, conditions of r1≤50 μm and r2≤50 μm are satisfied.

18 Claims, 18 Drawing Sheets

(51) Int. Cl.
*H01G 4/30* (2006.01)
*H01G 4/12* (2006.01)

(58) Field of Classification Search
USPC ............ 361/321.1, 321.2, 321.3, 306.3, 303,
361/301.4, 306.1
See application file for complete search history.

(56) References Cited

U.S. PATENT DOCUMENTS

| | | |
|---|---|---|
| 2013/0120899 A1 | 5/2013 | Chung et al. |
| 2014/0153154 A1* | 6/2014 | Choi ...................... H01G 4/30 |
| | | 361/301.4 |
| 2014/0177128 A1 | 6/2014 | Kim |
| 2014/0211369 A1* | 7/2014 | Sasabayashi ............ H01G 4/30 |
| | | 361/301.4 |
| 2015/0243438 A1 | 8/2015 | Ahn et al. |
| 2016/0293331 A1 | 10/2016 | Kitamura et al. |
| 2017/0162327 A1* | 6/2017 | Mizuno .................. H01G 4/232 |

FOREIGN PATENT DOCUMENTS

| | | |
|---|---|---|
| JP | 2005-259772 A | 9/2005 |
| JP | 2013-046052 A | 3/2013 |
| JP | 2013-106037 A | 5/2013 |
| JP | 2015-023287 A | 2/2015 |
| JP | 2015-062244 A | 4/2015 |
| JP | 2015-162673 A | 9/2015 |
| JP | 2016-015461 A | 1/2016 |
| JP | 2016-189423 A | 11/2016 |

\* cited by examiner

FIG. 25

|  | EXAMPLE 1 | EXAMPLE 2 | EXAMPLE 3 |
|---|---|---|---|
| SIZE | 1608 | 1608 | 1608 |
| THICKNESS OF DIELECTRIC LAYER [μm] | 0.35 | 0.40 | 0.48 |
| THICKNESS OF INTERNAL ELECTRODE LAYER [μm] | 0.22 | 0.26 | 0.35 |
| DIELECTRIC CONSTANT ε [F/m] | 2800 | 3000 | 3500 |
| VOLUME CAPACITY [μF/mm³] | 124 | 101 | 78 |
| MAXIMUM OUTER DIMENSION L0 IN LENGTH DIRECTION [mm] | 1.73 | 1.73 | 1.73 |
| MAXIMUM OUTER DIMENSION W0 IN WIDTH DIRECTION [mm] | 0.93 | 0.93 | 0.93 |
| MAXIMUM OUTER DIMENSION H0 IN HEIGHT DIRECTION [mm] | 0.93 | 0.93 | 0.93 |
| THICKNESS IN CENTRAL PORTION OF FIRST END MARGIN [μm] | 5 | 10 | 20 |
| THICKNESS IN CENTRAL PORTION OF SECOND END MARGIN [μm] | 5 | 10 | 20 |
| THICKNESS IN CENTRAL PORTION OF UPPER MARGIN [μm] | 5 | 10 | 20 |
| THICKNESS IN CENTRAL PORTION OF LOWER MARGIN [μm] | 20 | 30 | 40 |
| THICKNESS OF Cu PLATING LAYER [μm] | 3 | 3 | 3 |
| THICKNESS OF Ni PLATING LAYER [μm] | 3 | 3 | 3 |
| THICKNESS OF Sn PLATING LAYER [μm] | 3 | 3 | 3 |
| EFFECTIVE VOLUME [mm³] | 1.418 | 1.371 | 1.295 |
| CAPACITANCE (VOLUME CAPACITY X EFFECTIVE VOLUME) [μF] | 176.0 | 137.8 | 100.6 |

FIG. 26

|  | EXAMPLE 4 | EXAMPLE 5 | EXAMPLE 6 |
|---|---|---|---|
| SIZE | 1005 | 1005 | 1005 |
| THICKNESS OF DIELECTRIC LAYER [μm] | 0.35 | 0.40 | 0.48 |
| THICKNESS OF INTERNAL ELECTRODE LAYER [μm] | 0.22 | 0.26 | 0.35 |
| DIELECTRIC CONSTANT ε [F/m] | 2800 | 3000 | 3500 |
| VOLUME CAPACITY [μF/mm³] | 124 | 101 | 78 |
| MAXIMUM OUTER DIMENSION L0 IN LENGTH DIRECTION [mm] | 1.15 | 1.15 | 1.15 |
| MAXIMUM OUTER DIMENSION W0 IN WIDTH DIRECTION [mm] | 0.65 | 0.65 | 0.65 |
| MAXIMUM OUTER DIMENSION H0 IN HEIGHT DIRECTION [mm] | 0.65 | 0.65 | 0.65 |
| THICKNESS IN CENTRAL PORTION OF FIRST END MARGIN [μm] | 5 | 10 | 20 |
| THICKNESS IN CENTRAL PORTION OF SECOND END MARGIN [μm] | 5 | 10 | 20 |
| THICKNESS IN CENTRAL PORTION OF UPPER MARGIN [μm] | 5 | 10 | 20 |
| THICKNESS IN CENTRAL PORTION OF LOWER MARGIN [μm] | 20 | 30 | 40 |
| THICKNESS OF Cu PLATING LAYER [μm] | 3 | 3 | 3 |
| THICKNESS OF Ni PLATING LAYER [μm] | 3 | 3 | 3 |
| THICKNESS OF Sn PLATING LAYER [μm] | 3 | 3 | 3 |
| EFFECTIVE VOLUME [mm³] | 0.449 | 0.428 | 0.393 |
| CAPACITANCE (VOLUME CAPACITY X EFFECTIVE VOLUME) [μF] | 55.8 | 43.0 | 30.6 |

FIG. 27

| | EXAMPLE 7 | EXAMPLE 8 | EXAMPLE 9 |
|---|---|---|---|
| SIZE | 0603 | 0603 | 0603 |
| THICKNESS OF DIELECTRIC LAYER [μm] | 0.35 | 0.40 | 0.48 |
| THICKNESS OF INTERNAL ELECTRODE LAYER [μm] | 0.22 | 0.26 | 0.35 |
| DIELECTRIC CONSTANT ε [F/m] | 2800 | 3000 | 3500 |
| VOLUME CAPACITY [μF/mm³] | 124 | 101 | 78 |
| MAXIMUM OUTER DIMENSION L0 IN LENGTH DIRECTION [mm] | 0.67 | 0.67 | 0.67 |
| MAXIMUM OUTER DIMENSION W0 IN WIDTH DIRECTION [mm] | 0.37 | 0.37 | 0.37 |
| MAXIMUM OUTER DIMENSION H0 IN HEIGHT DIRECTION [mm] | 0.37 | 0.37 | 0.37 |
| THICKNESS IN CENTRAL PORTION OF FIRST END MARGIN [μm] | 5 | 10 | 20 |
| THICKNESS IN CENTRAL PORTION OF SECOND END MARGIN [μm] | 5 | 10 | 20 |
| THICKNESS IN CENTRAL PORTION OF UPPER MARGIN [μm] | 5 | 10 | 20 |
| THICKNESS IN CENTRAL PORTION OF LOWER MARGIN [μm] | 20 | 30 | 40 |
| THICKNESS OF Cu PLATING LAYER [μm] | 3 | 3 | 3 |
| THICKNESS OF Ni PLATING LAYER [μm] | 3 | 3 | 3 |
| THICKNESS OF Sn PLATING LAYER [μm] | 3 | 3 | 3 |
| EFFECTIVE VOLUME [mm³] | 0.080 | 0.073 | 0.063 |
| CAPACITANCE (VOLUME CAPACITY × EFFECTIVE VOLUME) [μF] | 9.91 | 7.34 | 4.86 |

FIG. 28

| | EXAMPLE 10 | EXAMPLE 11 | EXAMPLE 12 |
|---|---|---|---|
| SIZE | 0402 | 0402 | 0402 |
| THICKNESS OF DIELECTRIC LAYER [μm] | 0.35 | 0.40 | 0.48 |
| THICKNESS OF INTERNAL ELECTRODE LAYER [μm] | 0.22 | 0.26 | 0.35 |
| DIELECTRIC CONSTANT ε [F/m] | 2800 | 3000 | 3500 |
| VOLUME CAPACITY [μF/mm$^3$] | 124 | 101 | 78 |
| MAXIMUM OUTER DIMENSION L0 IN LENGTH DIRECTION [mm] | 0.41 | 0.41 | 0.41 |
| MAXIMUM OUTER DIMENSION W0 IN WIDTH DIRECTION [mm] | 0.21 | 0.21 | 0.21 |
| MAXIMUM OUTER DIMENSION H0 IN HEIGHT DIRECTION [mm] | 0.21 | 0.21 | 0.21 |
| THICKNESS IN CENTRAL PORTION OF FIRST END MARGIN [μm] | 5 | 10 | 20 |
| THICKNESS IN CENTRAL PORTION OF SECOND END MARGIN [μm] | 5 | 10 | 20 |
| THICKNESS IN CENTRAL PORTION OF UPPER MARGIN [μm] | 5 | 10 | 20 |
| THICKNESS IN CENTRAL PORTION OF LOWER MARGIN [μm] | 20 | 30 | 40 |
| THICKNESS OF Cu PLATING LAYER [μm] | 3 | 3 | 3 |
| THICKNESS OF Ni PLATING LAYER [μm] | 3 | 3 | 3 |
| THICKNESS OF Sn PLATING LAYER [μm] | 3 | 3 | 3 |
| EFFECTIVE VOLUME [mm$^3$] | 0.014 | 0.012 | 0.009 |
| CAPACITANCE (VOLUME CAPACITY X EFFECTIVE VOLUME) [μF] | 1.75 | 1.20 | 0.69 |

MULTILAYER CERAMIC CAPACITOR AND METHOD OF MANUFACTURING THE SAME

CROSS REFERENCE TO RELATED APPLICATIONS

This application claims the benefit of priority to Japanese Patent Application No. 2017-040991 filed on Mar. 3, 2017 and Japanese Patent Application No. 2017-040992 filed on Mar. 3, 2017, and is a Continuation Application of PCT Application No. PCT/JP2018/008142 filed on Mar. 2, 2018. The entire contents of each application are hereby incorporated herein by reference.

BACKGROUND OF THE INVENTION

1. Field of the Invention

The present invention relates to a multilayer ceramic capacitor and a method of manufacturing the same, and more particularly, to a multilayer ceramic capacitor in which a plurality of internal electrode layers are laminated in a direction parallel or substantially parallel to a mounting surface and a method of manufacturing the same.

2. Description of the Related Art

For example, Japanese Patent Application Laid-Open No. 2013-46052 discloses a multilayer ceramic capacitor in which a plurality of internal electrode layers are laminated in a direction parallel to the mounting surface.

More particularly, the multilayer ceramic capacitor disclosed in Japanese Patent Application Laid-Open No. 2013-46052 includes a pair of external electrodes on a bottom surface of a substantially rectangular parallelepiped laminated body including a top surface, the bottom surface, a pair of side surfaces, and a pair of end surfaces, whereby the bottom surface is configured as the mounting surface.

In the multilayer ceramic capacitor, a portion of the plurality of internal electrode layers laminated along the direction parallel to the bottom surface is connected to one of the pair of external electrodes in the laminated body, the rest of the plurality of internal electrode layers is connected to the other of the pair of external electrodes in the laminated body, whereby a capacitance unit is formed in the laminated body.

In this type of multilayer ceramic capacitor, there is a problem in that the capacitance is increased as in other typical multilayer ceramic capacitors, and improvement in this point is required.

Additionally, in this type of multilayer ceramic capacitor, due to its structure, an equivalent series resistance (ESR) tends to be higher with respect to the capacitance. This is because, in this type of multilayer ceramic capacitor, it is necessary to connect the capacitance unit in the laminated body and each of the pair of external electrodes in the laminated body in the portion located below the capacitance unit and above in the pair of external electrodes.

More particularly, each of the pair of external electrodes and the electrostatic capacitance unit are connected to each other by providing a pair of extended portions as a conductive path in the portion in the laminated body. In order to prevent generation of a short circuit between the pair of extended portions and to prevent the generation of the short circuit during mounting between the pair of external electrodes, it is necessary that the pair of extended portions are disposed considerably far away from each other. For this reason, a sectional area of each of the pair of extended portions is decreased, and as a result, a resistance of the conductive path in the concerned portion is increased.

SUMMARY OF THE INVENTION

Preferred embodiments of the present invention provide an increase to the capacitance in multilayer ceramic capacitors in each of which a plurality of internal electrode layers are laminated in a direction parallel or substantially parallel to the mounting surface, and in each of which an increase in equivalent series resistance is reduced or prevented while achieving the increase in the capacitance in the multilayer ceramic capacitors.

A multilayer ceramic capacitor according to a preferred embodiment of the present invention includes a laminated body, a first external electrode, and a second external electrode. The laminated body includes a plurality of dielectric layers and a plurality of internal electrode layers that are alternately laminated in a width direction, and includes a first side surface and a second side surface that are opposed to each other in the width direction, a top surface and a bottom surface that are opposed to each other in a height direction orthogonal or substantially orthogonal to the width direction, and a first end surface and a second end surface that are opposed to each other in a length direction orthogonal or substantially orthogonal to both the width direction and the height direction. The first external electrode is provided in a portion on the first end surface side of the bottom surface. The second external electrode is provided in a portion on the second end surface side of the bottom surface. The plurality of internal electrode layers include a plurality of first internal electrode layers connected to the first external electrode and a plurality of second internal electrode layers connected to the second external electrode. Each of the plurality of first internal electrode layers includes a first opposing portion opposed to the plurality of second internal electrode layers in the width direction. Each of the plurality of second internal electrode layers includes a second opposing portion opposed to the plurality of first internal electrode layers in the width direction. The laminated body is sectioned into at least an inner layer in which capacitance is generated by laminating the first opposing portion and the second opposing portion in the width direction, an upper margin located on the top surface side with respect to the inner layer in the height direction, a first side margin located on the first side surface side with respect to the inner layer in the width direction, and a second side margin located on the second side surface side with respect to the inner layer in the width direction, a first end margin located on the first end surface side with respect to the inner layer in the length direction, and a second end margin located on the second end surface side with respect to the inner layer in the length direction. In this multilayer ceramic capacitor, a ridge located on the first end surface side of the inner layer of ridges located on the top surface side is a first ridge, and a ridge located on the second end surface side of the inner layer of the ridges located on the top surface side is a second ridge, and when $r1$ is a curvature radius of the first ridge on a plane that is parallel or substantially parallel to both the height direction and the length direction and includes a center position of the inner layer, and $r2$ is a curvature radius of the second ridge on the plane that is parallel or substantially parallel to both the height direction and the length direction and includes the center position of the inner layer, conditions of $r1 \leq 50$ μm and $r2 \leq 50$ μm are satisfied.

In a multilayer ceramic capacitor according to a preferred embodiment of the present invention, a ridge of the laminated body connecting the top surface and the first end surface is set to a third ridge, and a ridge of the laminated body connecting the top surface and the second end surface is set to a fourth ridge, and when r3 is a curvature radius of the third ridge on the plane that is parallel or substantially parallel to both the height direction and the length direction and includes the center position of the inner layer, and r4 is a curvature radius of the fourth ridge on the plane that is parallel or substantially parallel to both the height direction and the length direction and includes the center position of the inner layer, it is preferable that conditions of r3≤50 μm and r4≤50 μm are satisfied.

In a multilayer ceramic capacitor according to a preferred embodiment of the present invention, the laminated body may further be sectioned into a lower margin located on the bottom surface side with respect to the inner layer in the height direction in addition to the inner layer, the upper margin, the first side margin, the second side margin, the first end margin, and the second end margin. In this case, each of the plurality of first internal electrode layers may further include a first extended portion connecting the first opposing portion and the first external electrode, and each of the plurality of second internal electrode layers may further include a second extended portion connecting the second opposing portion and the second external electrode. In this case, the lower margin may include a first extended region formed by locating the first extended portion of each of the plurality of first internal electrode layers at a portion on the first end surface side of the lower margin; and a second extended region defined by locating the second extended portion of each of the plurality of second internal electrode layers at a portion on the second end surface side of the lower margin. In this case, it is preferable that an outer shape of a first exposed portion that is exposed on the bottom surface in the first extended region is a rectangular or substantially rectangular shape, and an outer shape of a second exposed portion that is exposed on the bottom surface in the second extended region is rectangular or substantially rectangular shape. In this case, in a multilayer ceramic capacitor according to a preferred embodiment of the present invention, preferably when R1 is a curvature radius of a first corner located on the first end surface side and first side surface side of the first exposed portion, and R2 is a curvature radius of a second corner located on the second end surface side and first side surface side of the first exposed portion, a condition of R1<R2 is satisfied, when R3 is a curvature radius of a third corner located on the first end surface side and second side surface side of the first exposed portion, and R4 is a curvature radius of a fourth corner located on the second end surface side and second side surface side of the first exposed portion, a condition of R3<R4 is satisfied, when R5 is a curvature radius of a fifth corner located on the second end surface side and first side surface side of the second exposed portion, and R6 is a curvature radius of a sixth corner located on the first end surface side and first side surface side of the second exposed portion, a condition of R5<R6 is satisfied, and when R7 is a curvature radius of a seventh corner located on the second end surface side and second side surface side of the second exposed portion, and R8 is a curvature radius of an eighth corner located on the first end surface side and second side surface side of the second exposed portion, a condition of R7<R8 is satisfied.

In a multilayer ceramic capacitor according to a preferred embodiment of the present invention, the first external electrode may be made of a plating film directly covering the first exposed portion, and the second external electrode may be made of a plating film directly covering the second exposed portion.

In a multilayer ceramic capacitor according to a preferred embodiment of the present invention, it is preferable that when L1C is a dimension in the length direction in a central portion in the height direction of the first end margin on the plane that is parallel or substantially parallel to both the height direction and the length direction and includes the center position of the inner layer, a condition of L1C≤20 μm is satisfied, when L2C is a dimension in the length direction in a central portion in the height direction of the second end margin on the plane that is parallel or substantially parallel to both the height direction and the length direction and includes the center position of the inner layer, a condition of L2C≤20 μm is satisfied, and when H1C is a dimension in the height direction in a central portion in the length direction of the upper margin on the plane that is parallel or substantially parallel to both the height direction and the length direction and includes the center position of the inner layer, a condition of H1C≤20 μm is satisfied.

In a multilayer ceramic capacitor according to a preferred embodiment of the present invention, it is preferable that when L1A and L1B are a maximum value and a minimum value of a dimension in the length direction of the first end margin on the plane that is parallel or substantially parallel to both the height direction and the length direction and includes the central position of the inner layer, respectively, a condition of (L1A−L1B)/L1B≤0.2 is satisfied, when L2A and L2B are the maximum value and the minimum value of the dimension in the length direction of the second end margin on the plane that is parallel or substantially parallel to both the height direction and the length direction and includes the central position of the inner layer, respectively, a condition of (L2A−L2B)/L2B≤0.2 is satisfied, and when H1A and H1B are a maximum value and a minimum value of the dimension in the length direction of the upper margin on the plane that is parallel or substantially parallel to both the height direction and the length direction and includes the central position of the inner layer, respectively, a condition of (H1A−H1B)/H1B≤0.2 is satisfied.

In a multilayer ceramic capacitor according to a preferred embodiment of the present invention, it is preferable that when H0 is a maximum outer dimension in the height direction, and W0 is a maximum outer dimension in the width direction, a condition of (½)×W0≤H0≤W0 is satisfied.

In a multilayer ceramic capacitor according to a preferred embodiment of the present invention, the multilayer ceramic capacitor is preferably a 1608 size, and has a capacitance greater than or equal to about 100.6 μF.

In a multilayer ceramic capacitor according to a preferred embodiment of the present invention, the multilayer ceramic capacitor is preferably a 1005 size, and has a capacitance greater than or equal to about 30.6 μF.

In a multilayer ceramic capacitor according to a preferred embodiment of the present invention, the multilayer ceramic capacitor is preferably a 0603 size, and has a capacitance greater than or equal to about 4.86 μF.

In a multilayer ceramic capacitor according to a preferred embodiment of the present invention, the multilayer ceramic capacitor is preferably a 0402 size, and has a capacitance greater than or equal to about 0.69 μF.

A multilayer ceramic capacitor manufacturing method according to a preferred embodiment of the present invention includes the steps of preparing a soft laminating element formed by alternately laminating the plurality of dielectric layers and the plurality of internal electrode layers in the width direction, exposing the plurality of internal electrode layers on an outer surface on the first end surface side to be located on the first end surface side of the laminated body, exposing the plurality of internal electrode layers on an outer surface on the second end surface side to be located on the second end surface side of the laminated body, exposing the plurality of internal electrode layers on an outer surface on the top surface side to be located on the top surface side of the laminated body, and exposing the plurality of internal electrode layers on an outer surface on the bottom surface side to define the bottom surface of the laminated body; preparing a soft laminated body by forming a covering dielectric layer on each of the outer surface on the first end surface side of the soft laminating element, the outer surface on the second end surface side of the soft laminating element, and the outer surface on the top surface side of the laminating element; and obtaining the laminated body by firing the soft laminated body.

According to preferred embodiments of the present invention, the capacitance is able to be increased in multilayer ceramic capacitors in each of which the plurality of internal electrode layers are laminated in the direction parallel or substantially parallel to the mounting surface. Further, in the multilayer ceramic capacitors in each of which the plurality of internal electrode layers are laminated in the direction parallel or substantially parallel to the mounting surface, the increase in the equivalent series connection is able to be reduced or prevented while the capacitance is increased.

The above and other elements, features, steps, characteristics and advantages of the present invention will become more apparent from the following detailed description of the preferred embodiments with reference to the attached drawings.

BRIEF EXPLANATION OF THE DRAWINGS

FIG. 25 is a table illustrating specifications of multilayer ceramic capacitors according to Examples 1 to 3 of preferred embodiments of the present invention.

FIG. 26 is a table illustrating specifications of multilayer ceramic capacitors according to Examples 4 to 6 of preferred embodiments of the present invention.

FIG. 27 is a table illustrating specifications of multilayer ceramic capacitors according to Examples 7 to 9 of preferred embodiments of the present invention.

FIG. 28 is a table illustrating specifications of multilayer ceramic capacitors according to Examples 10 to 12 of preferred embodiments of the present invention.

DETAILED DESCRIPTION OF THE PREFERRED EMBODIMENTS

Figure 1:
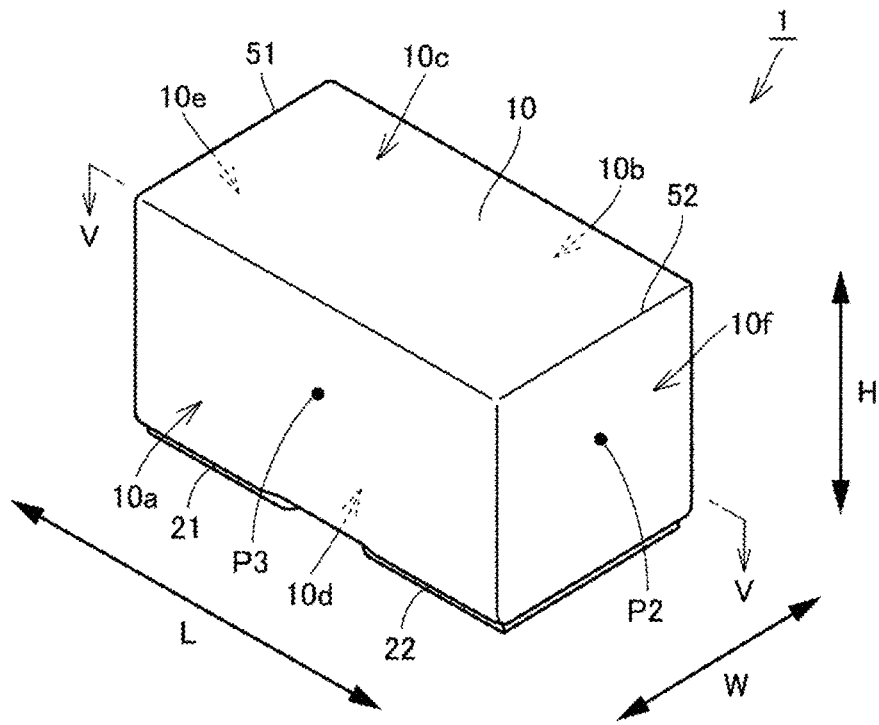
FIG. 1 is a schematic perspective view illustrating a multilayer ceramic capacitor according to a preferred embodiment of the present invention as viewed from a top surface side.

Hereinafter, preferred embodiments of the present invention will be described in detail with reference to the drawings. In the following preferred embodiments, the same or common portions are denoted by the same reference numerals in the drawings, and the description thereof will not be repeated.

Figure 2:
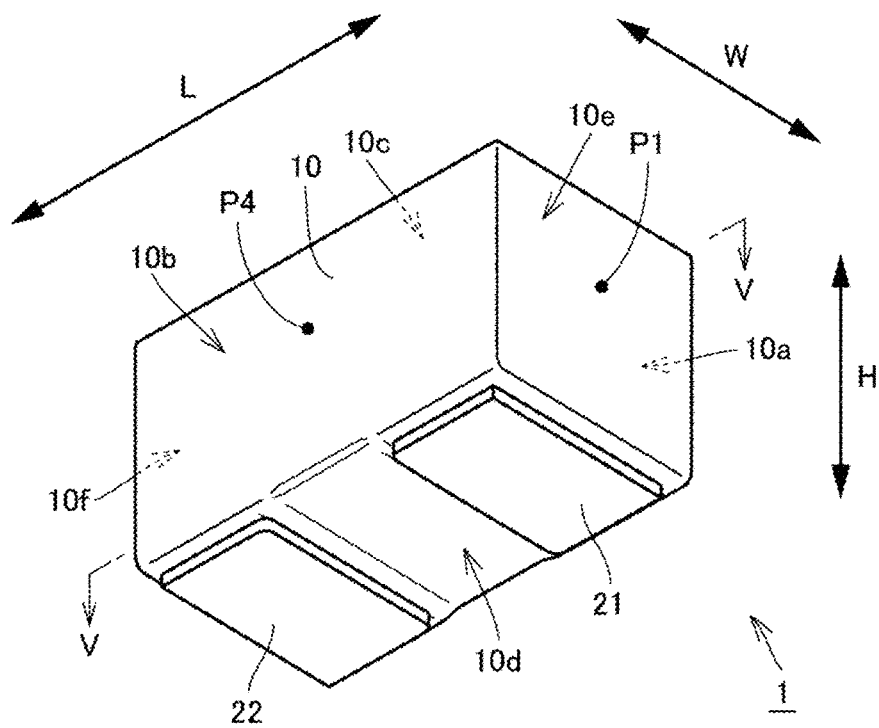
FIG. 2 is a schematic perspective view illustrating a multilayer ceramic capacitor of a preferred embodiment of the present invention as viewed from a bottom surface side.
Figure 3:
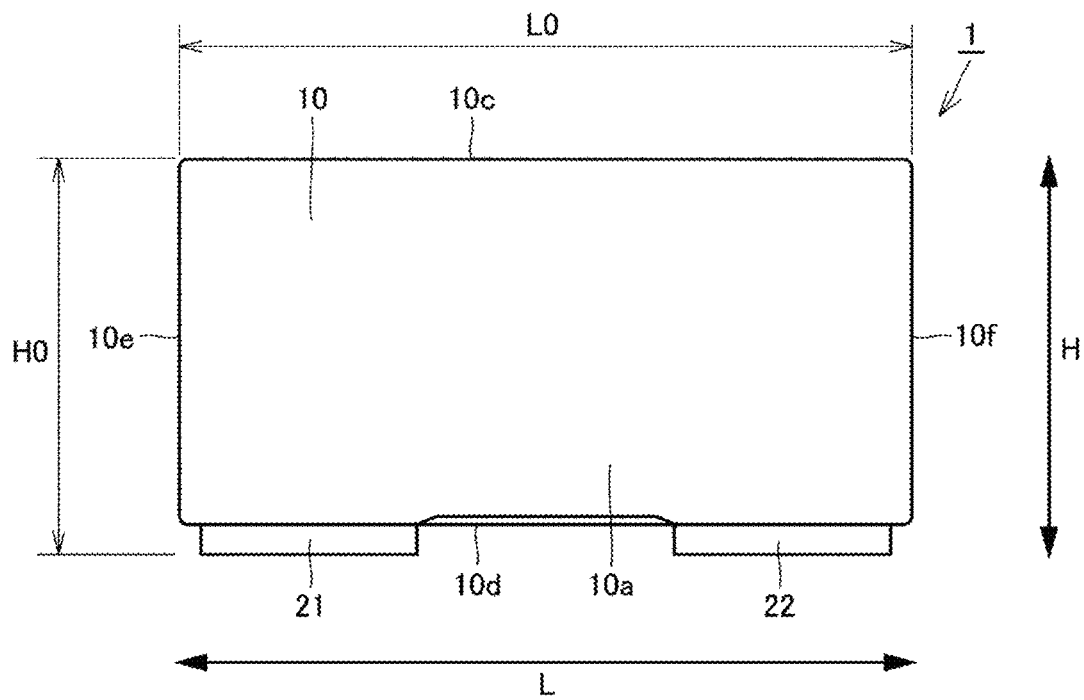
FIG. 3 is a schematic side view illustrating a multilayer ceramic capacitor of a preferred embodiment of the present invention.
Figure 4:
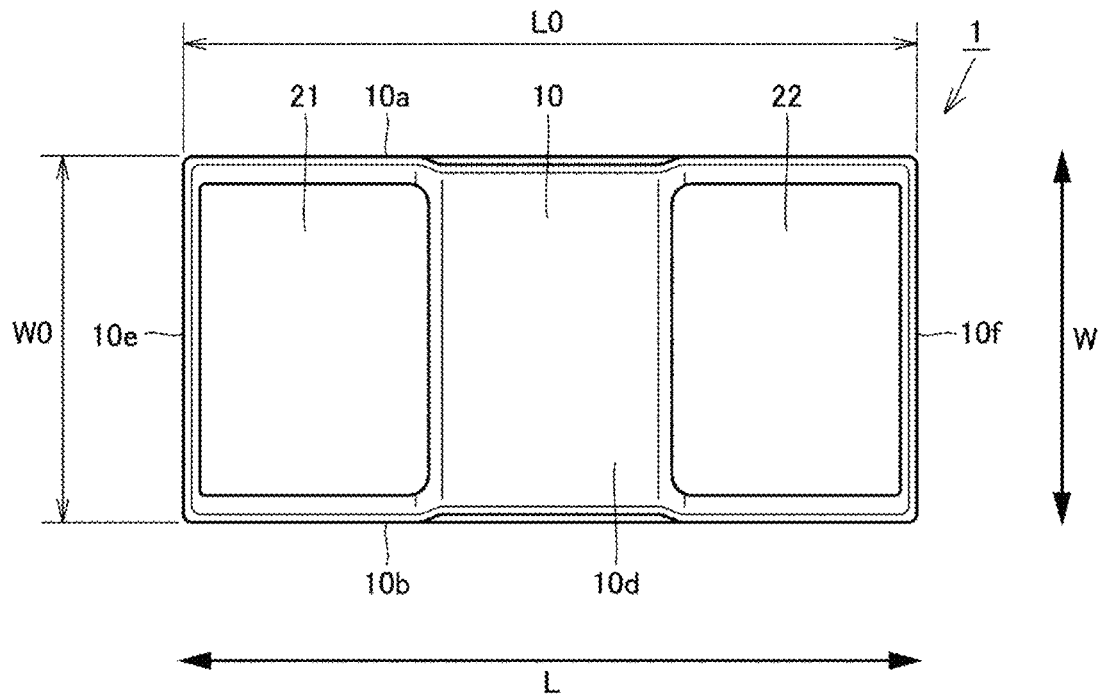
FIG. 4 is a schematic bottom view illustrating a multilayer ceramic capacitor of a preferred embodiment of the present invention.
Figure 5:
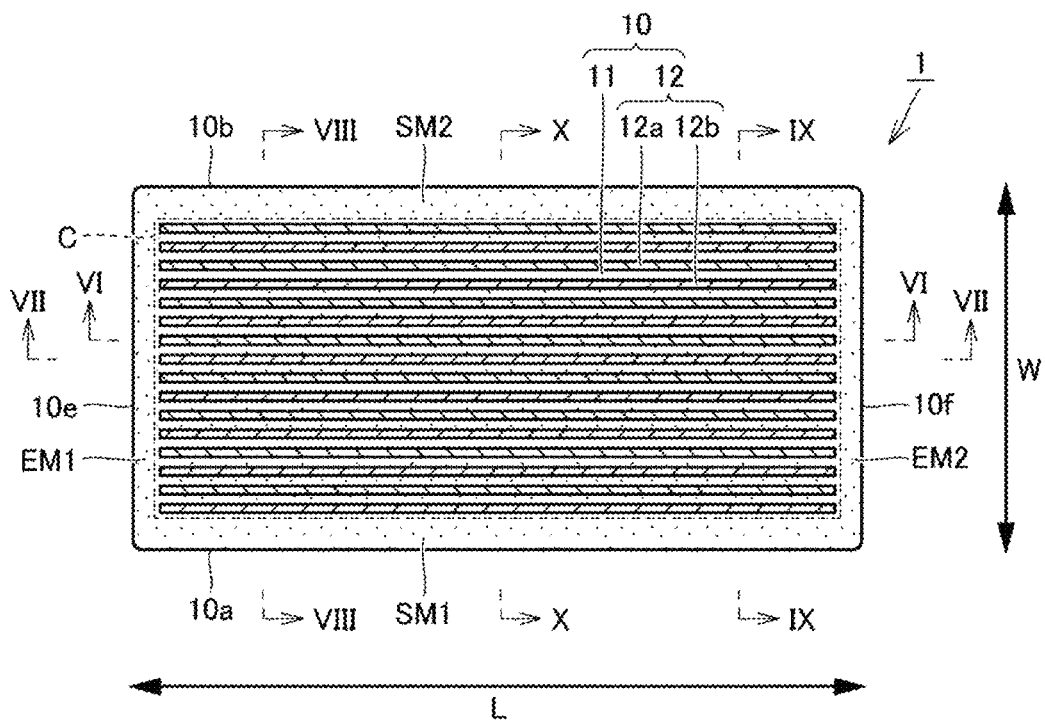
FIG. 5 is a schematic sectional view taken along a line V-V in FIGS. 1 and 2.
Figure 6:
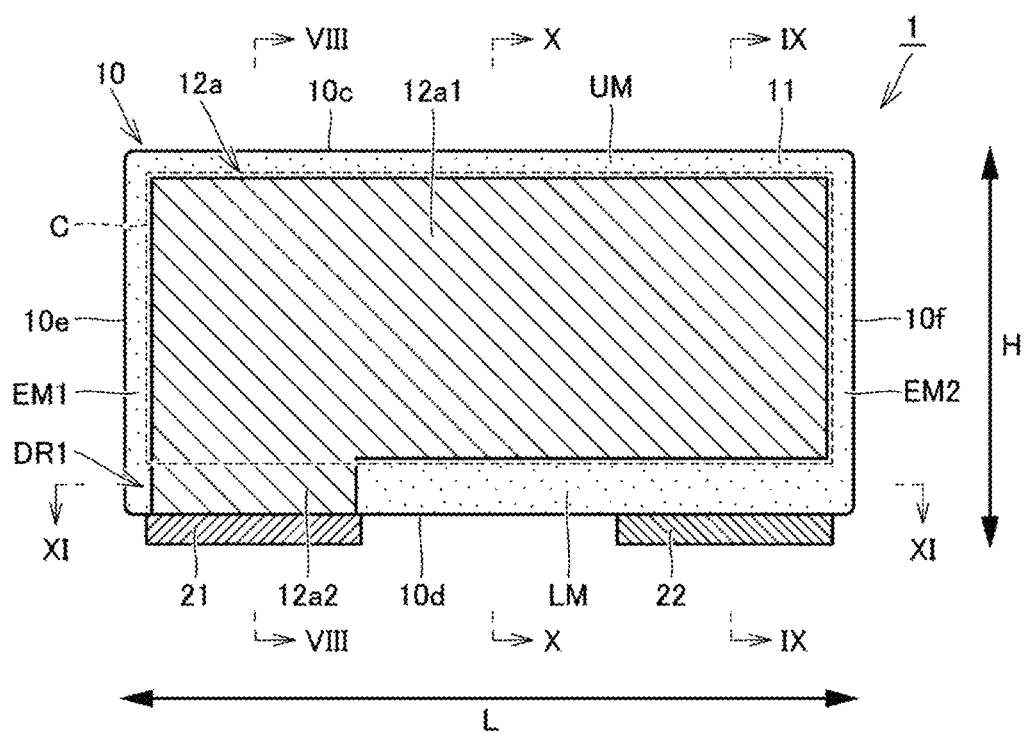
FIG. 6 is a schematic sectional view taken along a line VI-VI in FIG. 5.
Figure 7:
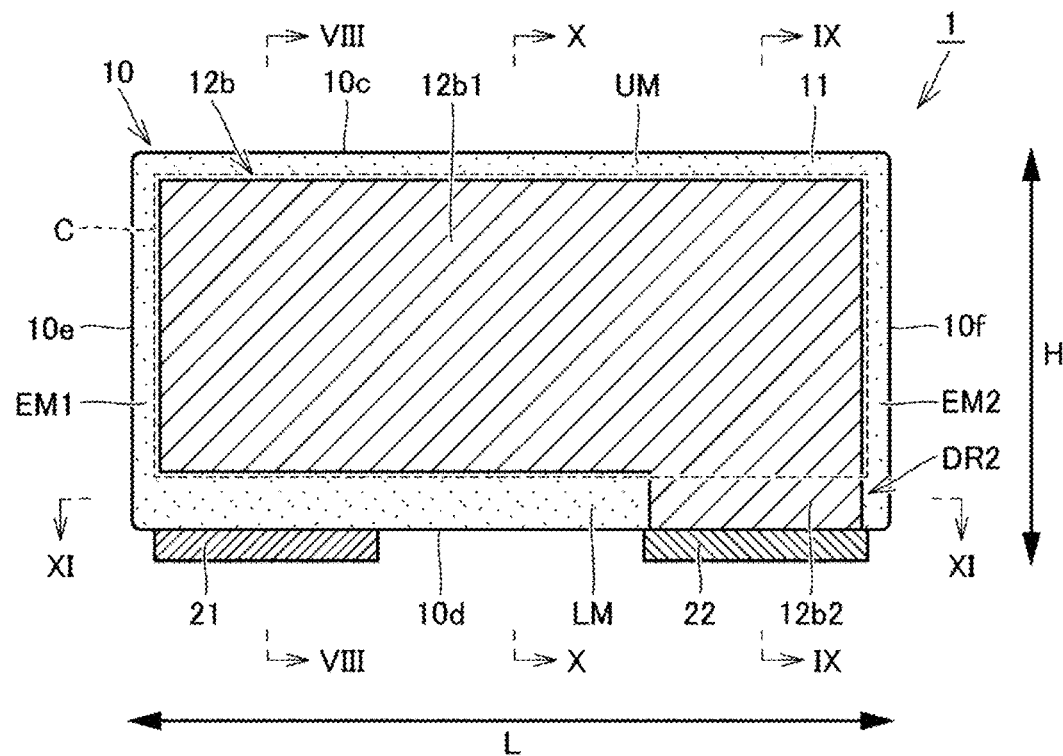
FIG. 7 is a schematic sectional view taken along a line VII-VII in FIG. 5.
Figure 8:
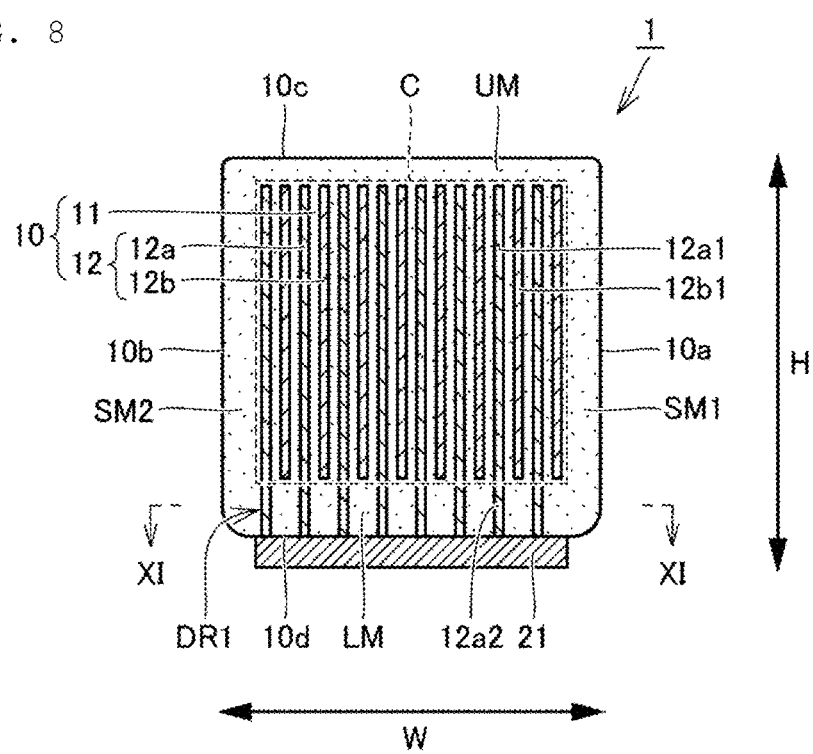
FIG. 8 is a schematic sectional view taken along a line VIII-VIII in FIGS. 5 to 7.
Figure 9:
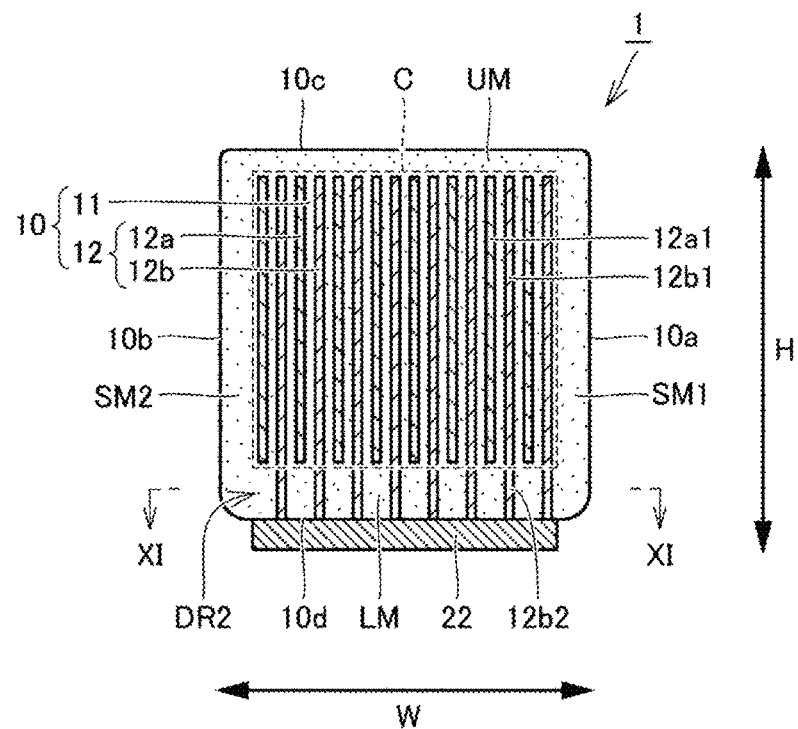
FIG. 9 is a schematic sectional view taken along a line IX-IX sin FIGS. 5 to 7.
Figure 10:
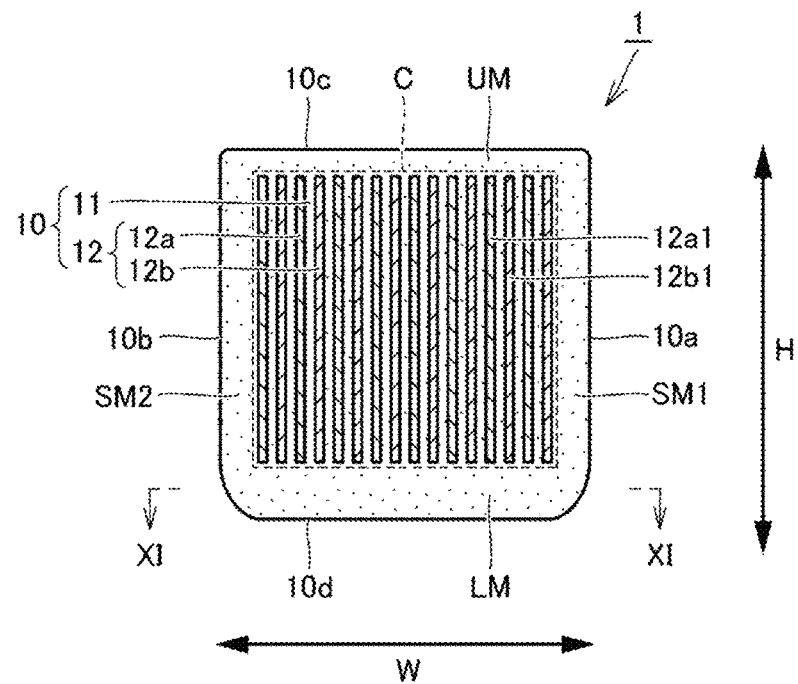
FIG. 10 is a schematic sectional view taken along a line X-X in FIGS. 5 to 7.
Figure 11:
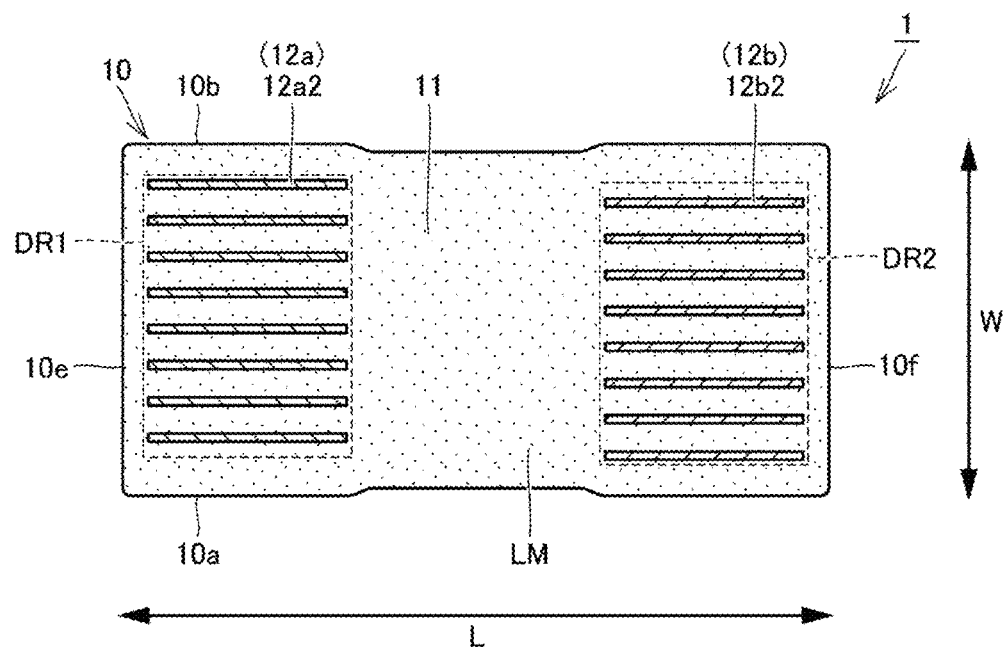
FIG. 11 is a schematic sectional view taken along a line XI-XI in FIGS. 6 to 10.

Schematic Configuration of Multilayer Ceramic Capacitor According to a Preferred Embodiment of the Present Invention FIGS. 1 and 2 are schematic perspective views illustrating a multilayer ceramic capacitor according to a preferred embodiment of the present invention as viewed from top surface and bottom surface sides, and FIGS. 3 and 4 are a schematic side view and a schematic bottom view of the multilayer ceramic capacitor. FIG. 5 is a schematic sectional view taken along a line V-V in FIGS. 1 and 2, and FIGS. 6 and 7 are schematic sectional views taken along lines VI-VI and VII-VII in FIG. 5. FIGS. 8 to 10 are schematic sectional views taken along lines VIII-VIII, IX-IX, and X-X in FIGS. 5 to 7, and FIG. 11 is a schematic sectional view taken along a line XI-XI in FIGS. 6 to 10. A schematic configuration of a multilayer ceramic capacitor of the preferred embodiment will be described below with reference to FIGS. 1 to 11. In FIGS. 1 to 11, a width direction, a height direction, and a length direction of a laminated body 10 (to be described later) are denoted by reference signs W, H, and L, respectively.

As illustrated in FIGS. 1 to 4, the multilayer ceramic capacitor 1 preferably has an elongated, rectangular or substantially rectangular parallelepiped shape, and includes the laminated body 10, a first external electrode 21, and a second external electrode 22.

The laminated body 10 preferably has an elongated, rectangular or substantially rectangular parallelepiped shape, and includes a first side surface 10a and a second side surface 10b that are opposed to each other in the width direction W, a top surface 10c and a bottom surface 10d that are opposed to each other in the height direction H orthogonal or substantially orthogonal to the width direction W, and a first end surface 10e and a second end surface 10f that are opposed to each other in the length direction L orthogonal or substantially orthogonal to both the width direction W and the height direction H. The first external electrode 21 and the second external electrode 22 are provided on the bottom surface 10d of the laminated body 10.

As illustrated in FIGS. 5 to 11, the laminated body 10 includes a plurality of dielectric layers 11 and a plurality of internal electrode layers 12 that are alternately laminated one by one. The plurality of dielectric layers 11 and the plurality of internal electrode layers 12 are laminated along the width direction W of the laminated body 10. As described below, although the number of laminated layers of the plurality of dielectric layers 11 and the plurality of internal electrode layers 12 is actually very large, the number of laminated layers is significantly reduced in the drawings for convenience.

The plurality of internal electrode layers 12 include a plurality of first internal electrode layers 12a connected to the first external electrode 21 and a plurality of second internal electrode layers 12b connected to the second external electrode 22. The plurality of first internal electrode layers 12a and the plurality of second internal electrode layers 12b are alternately disposed along the width direction W.

Each of the plurality of first internal electrode layers 12a includes a first opposing portion 12a1 opposed to the plurality of second internal electrode layers 12b in the width direction W and a first extended portion 12a2 connecting the first opposing portion 12a1 and the first external electrode 21. The first opposing portion 12a1 preferably has a rectangular or substantially rectangular shape as viewed along the width direction W, and the first extended portion 12a2 preferably has a rectangular or substantially rectangular shape in which dimensions in the height direction H and the length direction L of the first extended portion 12a2 are smaller than those of the first opposing portion 12a1 as viewed along the width direction W. The first opposing portion 12a1 and the first extended portion 12a2 are continuous in the height direction H.

Each of the plurality of second internal electrode layers 12b includes a second opposing portion 12b1 opposed to the plurality of first internal electrode layers 12a in the width direction W and a second extended portion 12b2 connecting the second opposing portion 12b1 and the second external electrode 22. The second opposing portion 12b1 is preferably a rectangular or substantially rectangular shape as viewed along the width direction W, and the second extended portion 12b2 preferably has a rectangular or substantially rectangular shape in which dimensions in the height direction H and the length direction L of the second extended portion 12b2 are smaller than those of the second opposing portion 12b1 as viewed along the width direction W. The second opposing portion 12b1 and the second extended portion 12b2 are continuous in the height direction H.

The laminated body 10 is partitioned into an inner layer C, an upper margin UM, a lower margin LM, a first side margin SM1, a second side margin SM2, a first end margin EM1, and a second end margin EM2.

The inner layer C is defined by the first opposing portion 12a1 included in each of the plurality of first internal electrode layers 12a, the second opposing portion 12b1 included in each of the plurality of second internal electrode layers 12b, and the plurality of dielectric layers 11 in a portion located between the first opposing portion 12a1 and the second opposing portion 12b1, thus generating the capacitance.

The upper margin UM is located on the side of the top surface 10c with respect to the inner layer C in the height direction H, and defined by the dielectric layer 11 located in the corresponding portion. The lower margin LM is located on the side of the bottom surface 10d with respect to the inner layer C in the height direction H, and defined by the dielectric layer 11 located in the corresponding portion, the first extended portion 12a2 included in each of the plurality of first internal electrode layers 12a, and the second extended portion 12b2 included in each of the plurality of second internal electrode layers 12b.

The first side margin SM1 is located on the side of the first side surface 10a with respect to the inner layer C in the width direction W, and defined by the dielectric layer 11 located in the corresponding portion. The second side margin SM2 is located on the side of the second side surface 10b with respect to the inner layer C in the width direction W, and defined by the dielectric layer 11 located in the corresponding portion.

The first end margin EM1 is located on the side of the first end surface 10e with respect to the inner layer C in the length direction L, and defined by the dielectric layer 11 located in the corresponding portion. The second end margin EM2 is located on the side of the second end surface 10f with respect to the inner layer C in the length direction L, and defined by the dielectric layer 11 located in the corresponding portion.

As illustrated in FIGS. 6 to 11, the lower margin LM includes a first extended region DR1 defined by the first extended portion 12a2 included in each of the plurality of first internal electrode layers 12a and the dielectric layer 11 in a portion located between the first internal electrode layers 12a and a second extended region DR2 defined by the second extended portion 12b2 included in each of the plurality of second internal electrode layers 12b and the dielectric layer 11 in a portion located between the second internal electrode layers 12b.

The first extended region DR1 is disposed at a position on the side of the first end surface 10e of the lower margin LM. The first extended region DR1 extends from the inner layer C toward the side of the bottom surface 10d, and is exposed in the bottom surface 10d. A first exposed portion 31 (see FIG. 12), which is a portion exposed in the bottom surface 10d of the first extended region DR1, preferably has a rectangular or substantially rectangular outer shape.

The second extended region DR2 is disposed at a position on the side of the second end surface 10f of the lower margin LM. The second extended region DR2 extends from the inner layer C toward the side of the bottom surface 10d, and is exposed in the bottom surface 10d. A second exposed portion 32 (see FIG. 12), which is a portion exposed in the bottom surface 10d of the second extended region DR2, preferably has a rectangular or substantially rectangular outer shape.

The first external electrode 21 is provided at a position on the side on the first end surface 10e of the bottom surface 10d so as to cover the exposed portion of the first extended region DR1, such that each of the plurality of first internal electrode layers 12a and the first external electrode 21 are connected to each other. The first external electrode 21 preferably has a rectangular or substantially rectangular outer shape covering the first exposed portion 31 as viewed along the height direction H (see FIG. 4).

The second external electrode 22 is provided at a position on the side of the second end surface 10f of the bottom surface 10d so as to cover the exposed portion of the second extended region DR2, such that each of the plurality of second internal electrode layers 12b and the second external electrode 22 are connected to each other. The second external electrode 22 preferably has a rectangular or substantially rectangular outer shape covering the second exposed portion 32 as viewed along the height direction H (see FIG. 4).

Referring to FIGS. 3 and 4, in multilayer ceramic capacitor 1, a maximum outer dimension L0 in the length direction L is larger than any of a maximum outer dimension W0 in the width direction W and a maximum outer dimension H0 in the height direction H. In the present preferred embodiment, the maximum outer dimension W0 in the width direction W and the maximum outer dimension H0 in the height direction H are preferably equal or substantially equal to each other. However, the maximum outer dimension W0 in the width direction W and the maximum outer dimension H0 in the height direction H may be different from each other. The equal or substantially equal largest outside dimension means that a dimension difference falls within a range within about 5%.

For example, the multilayer ceramic capacitor 1 may have the maximum outer dimensions L0, W0, and H0 of about 1.6 mm× about 0.8 mm× about 0.8 mm, about 1.0 mm× about 0.5 mm× about 0.5 mm, about 0.6 mm× about 0.3 mm× about 0.3 mm, or about 0.4 mm× about 0.2 mm× about 0.2 mm. The maximum outer dimensions L0, W0, and H0 may be measured by observing the multilayer ceramic capacitor 1 with an optical microscope or the like, for example.

Preferably, a corner and a ridge of the laminated body 10 are rounded. The corner is a portion where three surfaces among the first side surface 10a, the second side surface 10b, the top surface 10c, the bottom surface 10d, the first end surface 10e, and the second end surface 10f of the laminated body 10 are connected to one another. The ridge is a portion where two surfaces among the first side surface 10a, the second side surface 10b, the top surface 10c, the bottom surface 10d, the first end surface 10e, and the second end surface 10f of the laminated body 10 are connected to each other. Irregularities or steps may be provided at any position on the outer surface of the laminated body 10.

The dielectric layer 11 is preferably made of, for example, a perovskite compound containing Ba or Ti. A dielectric material ceramic mainly containing any one of $BaTiO_3$, $CaTiO_3$, $SrTiO_3$, and $CaZrO_3$, for example, may preferably be used as a material for the dielectric layer 11. The dielectric layer 11 may be made using a material in which at least any one of a Mn compound, a Mg compound, a Si compound, an Fe compound, a Cr compound, a Co compound, a Ni compound, an Al compound, a V compound, and a rare earth compound is added as a secondary ingredient while any one of $BaTiO_3$, $CaTiO_3$, $SrTiO_3$, and $CaZrO_3$ is included as a main component. Preferably, relative permittivity of the material constituting the dielectric layer 11 is greater than or equal to about 1000, for example.

Any one of Ni, Cu, Ag, Pd, and Au, or an alloy containing any of Ni, Cu, Ag, Pd, and Au (for example, an alloy of Ag and Pd), for example, may preferably be used as a material for the internal electrode layer 12. The internal electrode layer 12 may include particles made of a dielectric material having the same composition as the dielectric ceramic included in the dielectric layer 11.

Preferably, a thickness of each of the plurality of internal electrode layers 12 is, for example, less than or equal to about 1.0 μm, and more preferably is less than or equal to about 0.35 μm. Preferably, a coverage at which each of the plurality of internal electrode layers 12 covers the dielectric layer 11 with no gap is, for example, greater than or equal to about 50% and less than or equal to about 95%.

The first external electrode 21 and the second external electrode 22 preferably include only a plating layer directly covering the first exposed portion 31 of the first extended region DR1 and the second exposed portion 32 of the second extended region DR2. Any one of Ni, Cu, Ag, Pd, and Au, or an alloy containing any one of Ni, Cu, Ag, Pd, and Au (for example, an alloy of Ag and Pd), for example, may preferably be used as a material for the plating layer.

When including only the plating layer, each of the first external electrode 21 and the second external electrode 22 is preferably a laminated structure of the plating layer including a Cu plating layer covering the first exposed portion 31 of the first extended region DR1 and the second exposed portion 32 of the second extended region DR2, a Ni plating layer covering the Cu plating layer, and a Sn plating layer covering the Ni plating layer, for example.

Alternatively, the first external electrode 21 and the second external electrode 22 may include an underlying electrode layer and a plating layer covering the underlying electrode layer. The underlying electrode layer preferably includes at least one of a baked layer, a resin layer, and a metal thin film layer, for example.

The baked layer preferably includes metal and glass, any one of Ni, Cu, Ag, Pd and Au, or an alloy containing any one of Ni, Cu, Ag, Pd and Au (for example, an alloy of Ag and Pd), for example, may be used as the metal, and glass containing Si and Zn, for example, may be used as the glass. The baked layer may include a plurality of laminated layers. The baking layer may be a layer that is baked after a conductive paste is applied to the laminated body 10, or a layer that is fired at the same time as the internal electrode layer 12, for example.

The resin layer preferably includes conductive particles and a thermosetting resin, for example. The resin layer may be directly provided on the laminated body 10 without providing the baking layer. The resin layer may include a plurality of laminated layers.

The metal thin film layer is formed by a thin film forming method, such as a sputtering method and a vapor deposition method, for example. The metal thin film layer is a layer preferably having the thickness less than or equal to about 1 μm, for example, in which metal particles are deposited.

The plating layer may include a plurality of laminated layers. In this case, preferably the plating layer has a two-layer structure in which the Sn plating layer is provided on the Ni plating layer. The Ni plating layer prevents the underlying electrode layer and the like from being corroded by solder when the multilayer ceramic capacitor 1 is mounted. The Sn plating layer improves wettability to the solder when the multilayer ceramic capacitor 1 is mounted.

Figure 12:
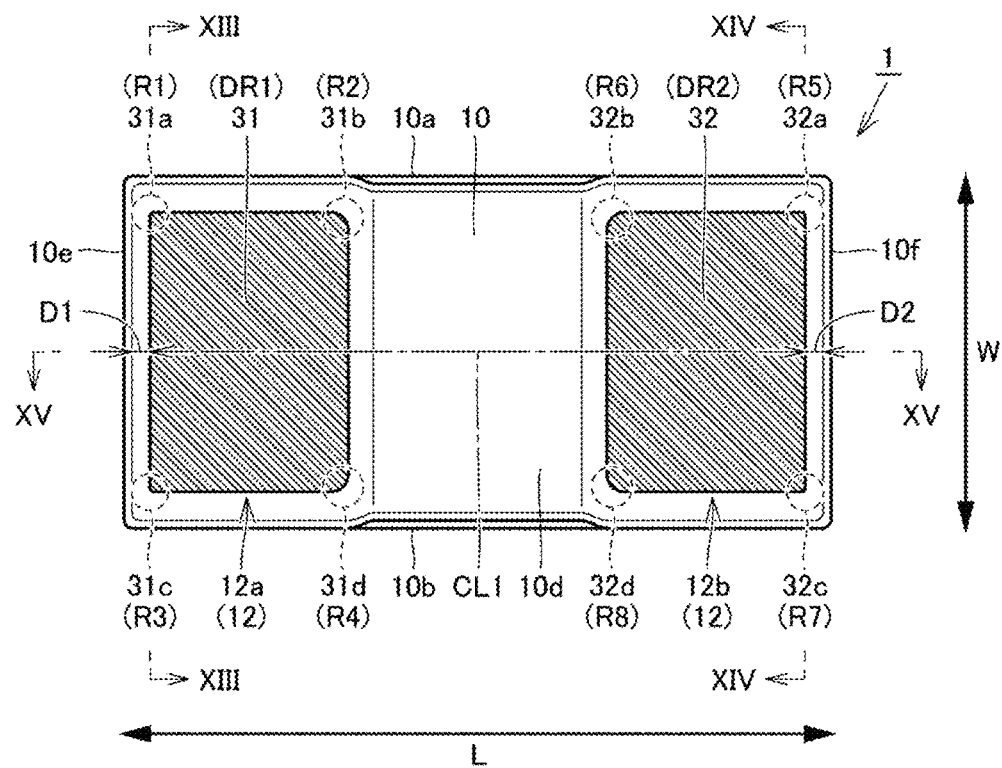
FIG. 12 is a bottom view illustrating a laminated body of the multilayer ceramic capacitor of the first preferred embodiment of the present invention.
Figure 13:
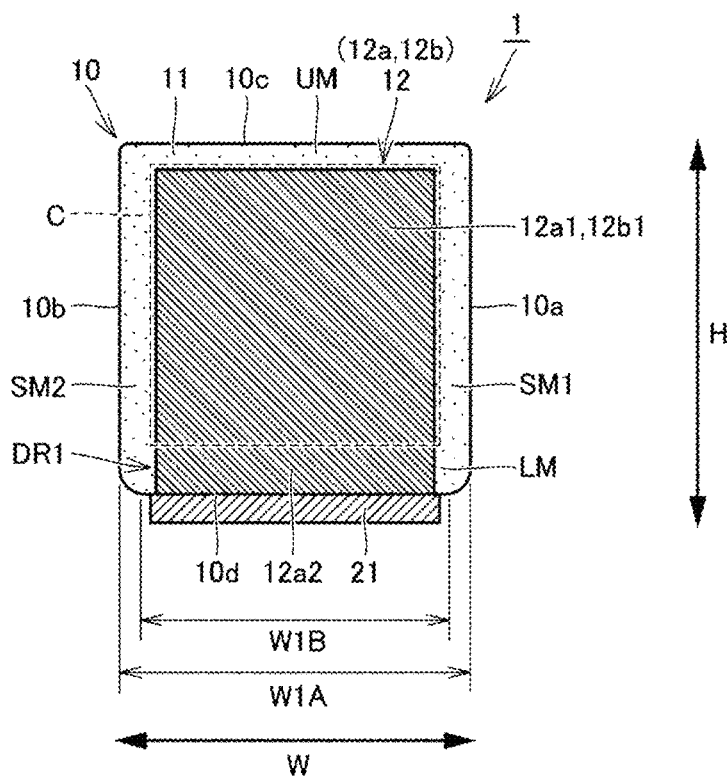
FIG. 13 is a sectional view illustrating the multilayer ceramic capacitor taken along a line XIII-XIII in FIG. 12.
Figure 14:
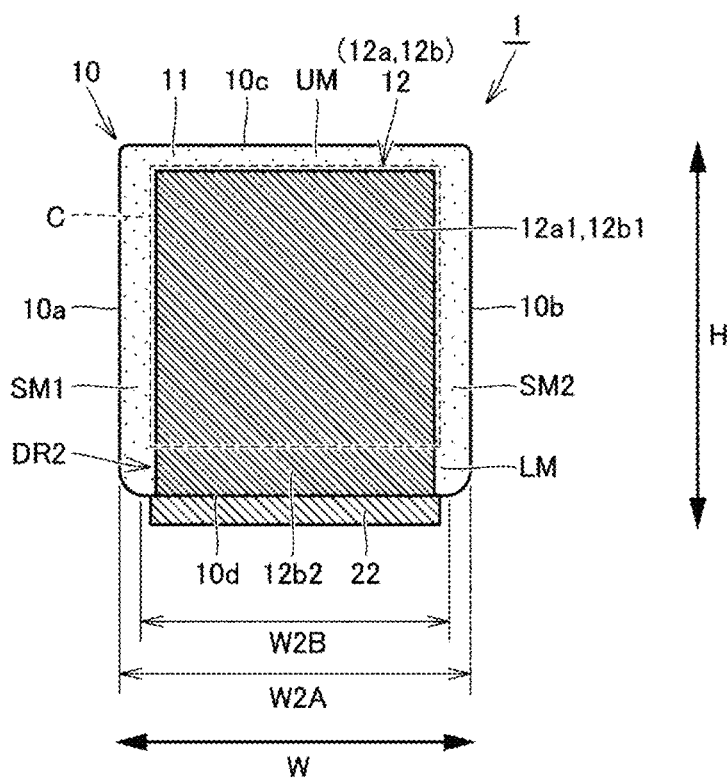
FIG. 14 is a sectional view illustrating the multilayer ceramic capacitor taken along a line XIV-XIV in FIG. 12.
Figure 15:
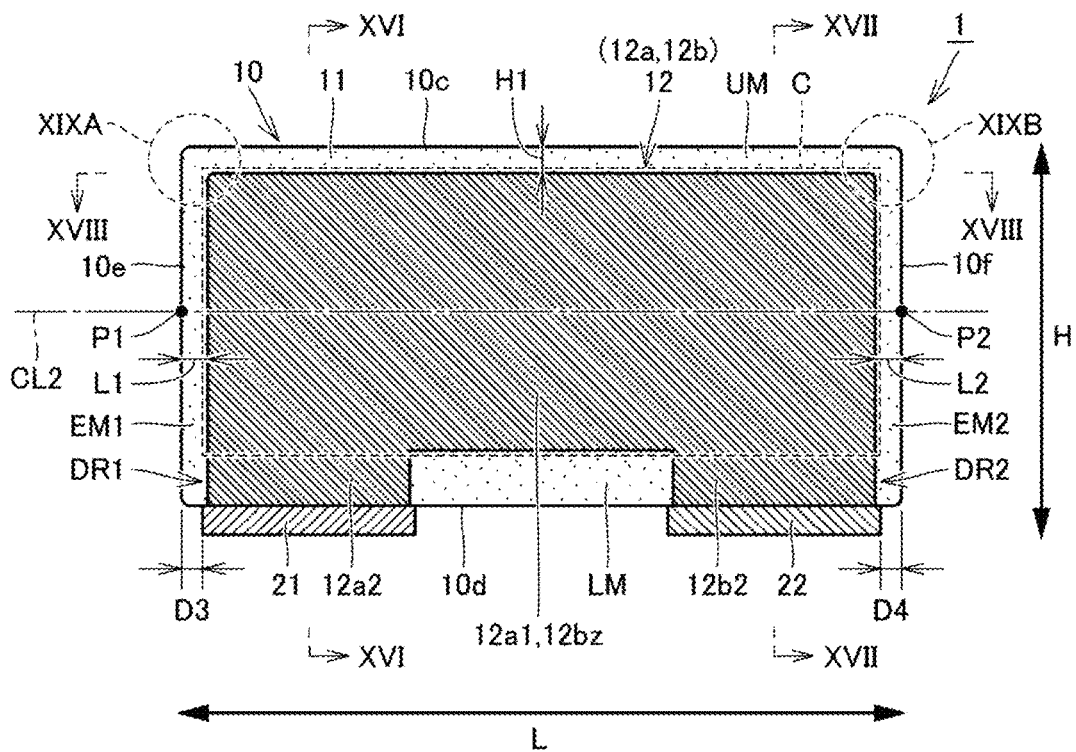
FIG. 15 is a sectional view illustrating the multilayer ceramic capacitor taken along a line XV-XV in FIG. 12.
Figure 16:
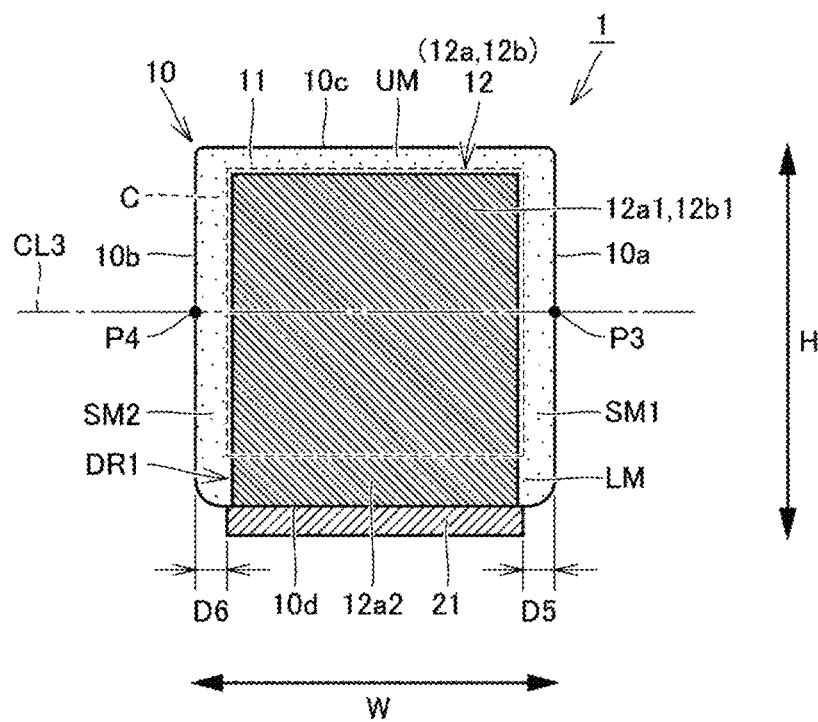
FIG. 16 is a sectional view taken along a line XVI-XVI in FIG. 15.
Figure 17:
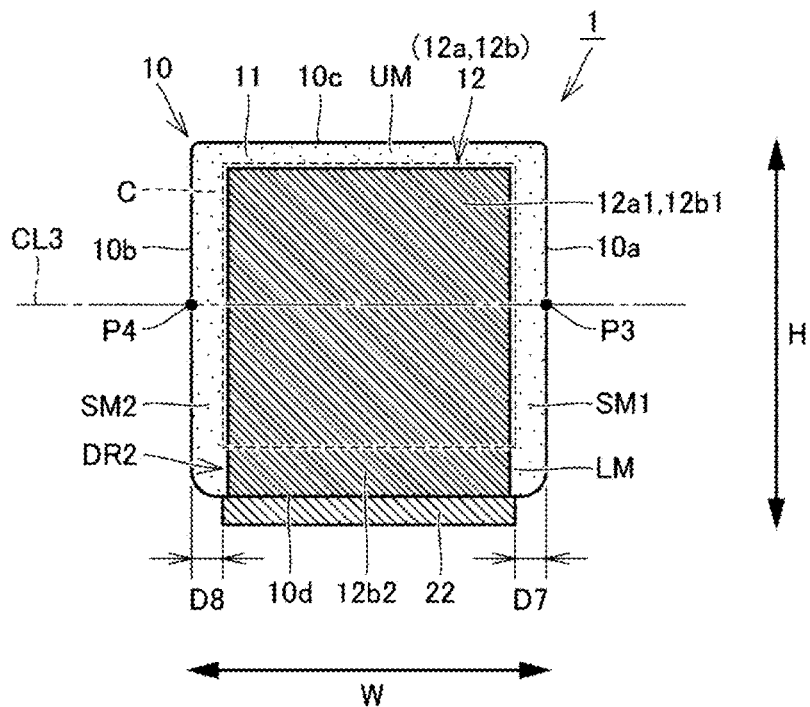
FIG. 17 is a sectional view taken along a line XVII-XVII in FIG. 15.
Figure 18:
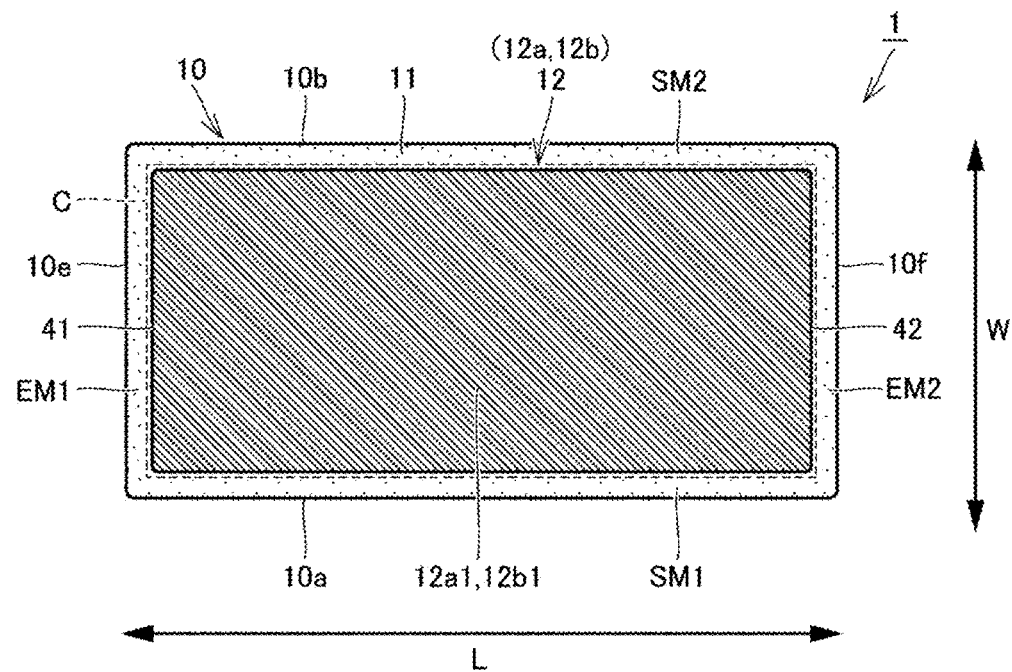
FIG. 18 is a sectional view taken along a line XVIII-XVIII in FIG. 15.
Figure 19A:
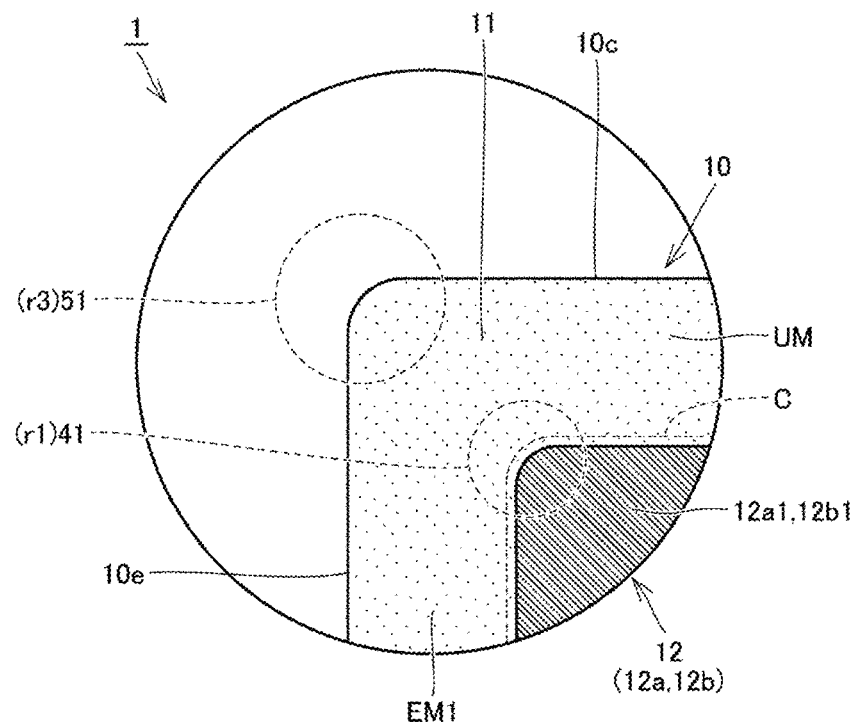
FIG. 19A is an enlarged view of a region XIXA in FIG. 15.
Figure 19B:
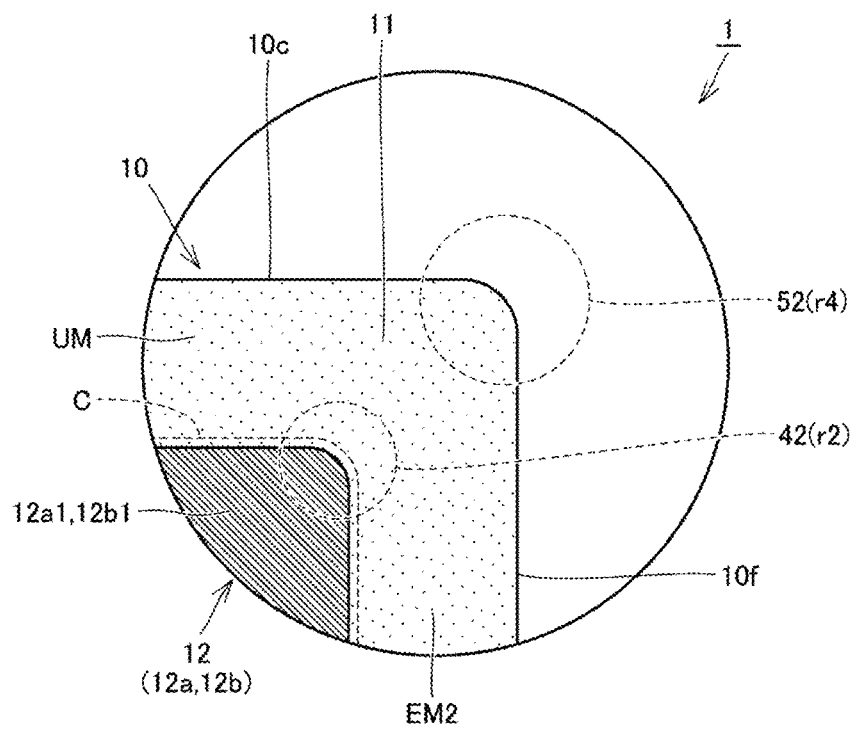
FIG. 19B is an enlarged view of a region XIXB in FIG. 15.

Detailed Configuration of Multilayer Ceramic Capacitor of Preferred Embodiment of the Present Invention FIG. 12 is a bottom view illustrating the laminated body of the multilayer ceramic capacitor of the present preferred embodiment, and FIGS. 13 to 15 are sectional views illustrating the laminated body of the multilayer ceramic capacitor taken along a line XIII-XIII, a line XIV-XIV, and a line XV-XV in FIG. 12, respectively. FIGS. 16 to 18 are sectional views taken along a line XVI-XVI, a line XVII-XVII, and a line XVIII-XVIII in FIG. 15, respectively. FIGS. 19A and 19B are enlarged views illustrating a region XIXA and a region XIXB in FIG. 15, respectively. The detailed configuration of the multilayer ceramic capacitor 1 of the present preferred embodiment will be described below with reference to FIGS. 12 to 19B.

In the multilayer ceramic capacitor 1 of the present preferred embodiment, the number of laminated layers of the plurality of dielectric layers 11 and the plurality of internal electrode layers 12 laminated along the width direction W in the inner layer C is preferably greater than or equal to 100, for example. The thickness of each of the plurality of dielectric layers 11 is less than or equal to about 1.0 μm, for example, in design value, and the thickness of each of the plurality of internal electrode layers 12 is less than or equal to about 1.0 μm, for example, in design value. Preferably, the thickness of each of the plurality of dielectric layers 11 is less than or equal to about 0.4 μm, for example, in design value.

In this case, in a portion where the plurality of dielectric layers 11 and the plurality of internal electrode layers 12 are located, when observed with a naked eye, a low-magnification optical microscope, or the like, the plurality of dielectric layers 11 and the plurality of internal electrode layers 12 are visually recognized as a single block region, but each of the dielectric layers 11 and each of the plurality of internal electrode layers 12 cannot individually be recognized. On the other hand, even in a portion where the plurality of internal electrode layers 12 are not located and only the plurality of dielectric layers 11 are located, when it is observed with the naked eye, the low-magnification optical microscope, or the like, the plurality of dielectric layers 11 are visually recognized as the single block region.

For this reason, in FIGS. 12 to 19B, the bottom surface 10d of the laminated body 10 and a predetermined cross section of the laminated body 10 are illustrated based on actual appearance when observed with the naked eye, the low-magnification optical microscope, or the like.

As illustrated in FIG. 12, as described above, the first extended region DR1 and the second extended region DR2 are exposed at the bottom surface 10d of the multilayer ceramic capacitor 1. The first exposed portion 31 that is the exposed portion of the first extended region DR1 is located on the side of the first end surface 10e, and the second exposed portion 32 that is the exposed portion of the second extended region DR2 is located on the side of the second end surface 10f.

The first extended region DR1 and the second extended region DR2 are spaced away from each other by a predetermined distance in the length direction L (see FIG. 11), such that the first exposed portion 31 and the second exposed portion 32 are also spaced away from each other by the predetermined distance in the length direction L. With this configuration, a short circuit is able to be prevented from being generated between the first extended region DR1 and the second extended region DR2, and a short circuit (a solder bridge or the like is generated) is able to be prevented from being generated between the first external electrode 21 and the second external electrode 22 during mounting.

The first exposed portion 31 preferably has a rectangular or substantially rectangular outer shape, and is spaced away from the first side surface 10a, the second side surface 10b, and the first end surface 10e by a predetermined distance. The first exposed portion 31 includes a first corner 31a located on the side of the first end surface 10e and the side of the first side surface 10a, a second corner 31b located on the side of the second end surface 10f and the side of the first side surface 10a, a third corner 31c located on the side of the first end surface 10e and the side of the second side surface 10b side, and a fourth corner 31d located on the side of the second end surface 10f and the side of the second side surface 10b.

The second exposed portion 32 preferably has a rectangular or substantially rectangular outer shape, and is spaced away from the first side surface 10a, the second side surface 10b, and the second end surface 10f by a predetermined distance. The second exposed portion 32 includes a fifth corner 32a located on the side of the second end surface 10f and the side of the first side surface 10a, a sixth corner 32b located on the side of the first end surface 10e and the side of the first side surface 10a, a seventh corner 32c located on the side of the second end surface 10f and the side of the second side surface 10b, and an eighth corner 32d located on the side of the first end surface 10e and the side of the second side surface 10b.

Each of the first corner 31a to the eighth corner 32d is slightly curved with a predetermined curvature. This is because the ridge is rounded in a process of pressure-bonding a ceramic green sheet when the multilayer ceramic capacitor 1 is manufactured by a multilayer ceramic capacitor manufacturing method according to the present preferred embodiment of the present invention (to be described below).

When R1 is a curvature radius of the first corner 31a, R2 is a curvature radius of the second corner 31b, R3 is a curvature radius of the third corner 31c, R4 is a curvature radius of the fourth corner 31d, R5 is a curvature radius of the fifth corner 32a, R6 is a curvature radius of the sixth corner 32b, R7 is a curvature radius of the seventh corner 32c, and R8 is a curvature radius of the eighth corner 32d, preferably the conditions of R1<R2, R3<R4, R5<R6, and R7<R8 (hereinafter referred to as a condition 1) are preferably satisfied in the multilayer ceramic capacitor 1 of the present preferred embodiment.

When the condition 1 is satisfied, in portions on both outsides in the length direction L of the bottom surface 10d of the laminated body 10, an area of the first exposed portion 31 and an area of the second exposed portion 32 are able to be largely secured by the smaller curvature radius of each of the first corner 31a, the third corner 31c, the fifth corner 32a, and the seventh corner 32c. The multilayer ceramic capacitor 1 having the above-described configuration is able to be manufactured by a multilayer ceramic capacitor manufacturing method according to a preferred embodiment of the present invention (to be described below).

When the multilayer ceramic capacitor 1 is manufactured by the multilayer ceramic capacitor manufacturing method of a preferred embodiment of the present invention (to be described later) so as to satisfy the condition 1, the first extended region DR1 and the second extended region DR2 are preferably formed so as to have cross sections equal or substantially equal to the area of the first exposed portion 31 and the area of the second exposed portion 32 along the extending direction, respectively.

Thus, by providing the configuration, a sectional area of the first extended region DR1 and a sectional area of the second extended region DR2 is able to be increased as compared to the conventional multilayer ceramic capacitor having the same size, and an increase in the equivalent series resistance is able to be effectively reduced or prevented.

When the multilayer ceramic capacitor 1 is manufactured so as to satisfy the condition 1, it is confirmed that an equivalent series inductance (ESL) that is a parasitic inductance is decreased, to some extent.

When the multilayer ceramic capacitor is manufactured by a multilayer ceramic capacitor manufacturing method according to a comparative example (to be described below) (a conventional known general multilayer ceramic capacitor manufacturing method), the curvature radius of each of the first corner, the third corner, the fifth corner, and the seventh corner is equal or substantially equal to the curvature radius of each of the second corner, the fourth corner, the sixth corner, and the eighth corner, and the area of the first exposed portion and the area of the second exposed portion are decreased by the first corner, the third corner, the fifth corner, and the seventh corner and the second corner, the fourth corner, the sixth corner, and the eighth corner, respectively, and accordingly the sectional area of the first extended region and the sectional area of the second extended region are also decreased.

Preferably, the curvature radii R1, R3, R5, and R7 satisfy the conditions of R1≤40 μm, R3≤40 μm, R5≤40 μm, and R7≤40 μm, for example. At this point, the curvature radius of these corners is about 60 μm at the minimum when the multilayer ceramic capacitor is manufactured by the multilayer ceramic capacitor manufacturing method of the comparative example.

The curvature radii R1 to R8 may be measured by observing the corners of the first exposed portion 31 and the second exposed portion 32 with a microscope, the curvature radii of the corners being obtained, and the detailed measurement method will be described below.

Referring to FIG. 12, when D1 is a distance between the first exposed portion 31 and the first end surface 10e at a position (that is, a position on a center line CL1 in FIG. 12) corresponding to a central portion in the width direction W of inner layer C in bottom surface 10d of laminated body 10, and D2 is a distance between the second exposed portion 32 and the second end surface 10f at a position (that is, the position on the center line CL1 in FIG. 12) corresponding to the central portion in the width direction W of the inner layer C on the bottom surface 10d of the laminated body 10, preferably the multilayer ceramic capacitor 1 satisfies conditions of D1≤50 μm and D2≤50 μm, for example, (hereinafter referred to as a condition 2).

When the condition 2 is satisfied, the area of the first exposed portion 31 and the area of the second exposed portion 32 are able to largely be secured by an amount in which the first exposed portion 31 and the second exposed portion 32 come close to the first end surface 10e and the second end surface 10f in both outsides in the length direction L of the bottom surface 10d of the laminated body 10, and accordingly, the sectional area of the first extended region DR1 and the sectional area of the second extended region DR2 is able to be enlarged. The multilayer ceramic capacitor 1 having the above configuration is able to be manufactured by the multilayer ceramic capacitor manufacturing method of the present preferred embodiment of the present invention (to be described below).

Thus, by providing the configuration, an increase in an equivalent series resistance is able to be further effectively reduced or prevented as compared to the conventional multilayer ceramic capacitor having the same size. At this point, the distance between the first exposed portion 31 and the first end surface 10e and the distance between the second exposed portion 32 and the second end surface 10f are about 70 μm at the minimum when the multilayer ceramic capacitor is manufactured by a multilayer ceramic capacitor manufacturing method according to a comparative example (to be described below).

Referring to FIG. 13, when W1A is a dimension in the width direction W of the laminated body 10 at the position corresponding to the central portion in the height direction H of the inner layer C on a plane (that is, the section in FIG. 13) that is parallel or substantially parallel to both the width direction W and the height direction H and includes a boundary between the inner layer C and the first end margin EM1, and W1B is a dimension in the width direction W of the laminated body 10 in the bottom surface 10d on the plane (that is, the section in FIG. 13) that is parallel or substantially parallel to both the width direction W and the height direction H and includes the boundary between the inner layer C and the first end margin EM1, preferably the multilayer ceramic capacitor 1 satisfies the condition of W1A−W1B≤60 μm, for example, (hereinafter, referred to as a condition 3-1).

Referring to FIG. 14, when W2A is a dimension in the width direction W of the laminated body 10 at the position corresponding to the central portion in the height direction H of the inner layer C on a plane (that is, the section in FIG. 14) that is parallel or substantially parallel to both the width direction W and the height direction H and includes a boundary between the inner layer C and the second end margin EM2, and W2B is a dimension in the width direction W of the laminated body 10 in the bottom surface 10d on the plane (that is, the section in FIG. 14) that is parallel or substantially parallel to both the width direction W and the height direction H and includes the boundary between the inner layer C and the second end margin EM2, preferably the multilayer ceramic capacitor 1 satisfies the condition of W2A−W2B≤60 μm, for example, (hereinafter, referred to as a condition 3-2).

When the conditions 3-1 and 3-2 are satisfied, the area of the first exposed portion 31 and the area of the second exposed portion 32 are able to be largely secured by an amount in which the first exposed portion 31 and the second exposed portion 32 come close to the first side surface 10a and the second side surface 10b in both outsides in the width direction W of the bottom surface 10d of the laminated body 10, and accordingly, the sectional area of the first extended region DR1 and the sectional area of the second extended region DR2 are able to be enlarged. The multilayer ceramic capacitor 1 having the above configuration is able to be manufactured by the multilayer ceramic capacitor manufacturing method of the present preferred embodiment of the present invention (to be described below).

Thus, by providing the configuration, an increase in an equivalent series resistance is able to be further effectively reduced or prevented as compared with the conventional multilayer ceramic capacitor having the same size. At this point, these dimensional differences are about 200 μm at the minimum when the multilayer ceramic capacitor is manufactured by the multilayer ceramic capacitor manufacturing method of the comparative example (to be described later).

Referring to FIG. 15, when D3 is a distance along the length direction L between the first external electrode 21 and the position (that is, the position of a point P1 (see FIG. 2) where the center line CL2 of the inner layer C in FIG. 15 and the first end surface 10e intersect each other), and D4 is a distance along the length direction L between the second external electrode 22 and the position (that is, the position of a point P2 (see FIG. 1) where the center line CL2 of the inner layer C in FIG. 15 and the second end surface 10f intersect each other) of the second end surface 10f corresponding to the center position of the inner layer C when viewed along the length direction L, preferably the multilayer ceramic capacitor 1 satisfies the conditions of 5 μm≤D3≤20 μm and 5 μm≤D4≤20 μm, for example, (hereinafter, referred to as a condition 4).

When the condition 4 is satisfied, the first external electrode 21 and the second external electrode 22 are able to be formed larger by an amount in which the first external electrode 21 and the second external electrode 22 come close to the first end surface 10e and the second end surface 10f in both outsides in the length direction L of the bottom surface 10d of the laminated body 10, so that mounting stability after the mounting on a wiring board and the like is able to be secured. When the first external electrode 21 and the second external electrode 22 extend inward in the length direction L, undesirably, a short circuit is easily generated during the mounting (a solder bridge or the like is easily generated).

Referring to FIGS. 16 and 17, when D5 is a distance along the width direction W between the first external electrode 21 and the position (that is, the position of a point P3 (see FIG. 1) where a center line CL3 of the inner layer C in FIG. 16 and the first side surface 10a intersect each other) of the first side surface 10a corresponding to the center position of the inner layer C as viewed along the width direction W, D6 is a distance along the width direction W between the first external electrode 21 and the position (that is, the position of a point P4 (see FIG. 2) where the center line CL3 of the inner layer C in FIG. 16 and the second side surface 10b intersect each other) of the second side surface 10b corresponding to the center position of the inner layer C as viewed along the width direction W, D7 is a distance along the width direction W between the second external electrode 22 and the position (that is, the position of a point P3 (see FIG. 1) where the center line CL3 of the inner layer C in FIG. 17 and the first side surface 10a intersect each other) of the first side surface 10a corresponding to the center position of the inner layer C as viewed along the width direction W, and D8 is a distance along the width direction W between the second external electrode 22 and the position (that is, the position of a point P4 (see FIG. 2) where the center line CL3 of the inner layer C in FIG. 17 and the second side surface 10b intersect each other) of the second side surface 10b corresponding to the center position of the inner layer C as viewed along the width direction W, preferably the multilayer ceramic capacitor 1 satisfies the conditions of D5≥30 μm, D6≥30 μm, D7≥30 μm, and D8≥30 μm, for example, (hereinafter, referred to as a fifth condition).

When the condition 5 is satisfied, after the mounting on the wiring board or the like, interference with the adjacent electronic component is able to be prevented by an amount in which the first external electrode 21 and the second external electrode 22 are separated from the first side surface 10a and the second side surface 10b at the both outsides in the width direction W of the bottom surface 10d of the laminated body 10. This is because a layout in which another electronic component is disposed adjacent to the multilayer ceramic capacitor along the width direction W of the multilayer ceramic capacitor is often used.

As illustrated in FIG. 18, the inner layer C of the multilayer ceramic capacitor 1 preferably has a rectangular or substantially rectangular outer shape at the end (that is, a boundary between the inner layer C and the upper margin UM) on the side of the top surface 10c of the laminated body 10. The outer shape of the end on the side of the top surface 10c of the inner layer C is defined by the ridge connecting the top surface of the inner layer C and each of a pair of side surfaces and a pair of end surfaces of the inner layer C. The ridge has a slightly curved shape with a predetermined curvature. The ridge includes a first ridge 41 located on the side of the first end surface 10e of the laminated body 10 and a second ridge 42 located on the side of the second end surface 10f of the laminated body 10.

The reason why the curved ridge is provided in an outer periphery at the upper end of the inner layer C is that the ridge is rounded in a process of bonding a covering ceramic green sheet to a soft laminating element when the multilayer ceramic capacitor 1 is manufactured by the multilayer ceramic capacitor manufacturing method of the present preferred embodiment of the present invention (to be described below).

Referring to FIG. 1, the upper end of the laminated body 10 includes a third ridge 51 that is a portion connecting the top surface 10c and the first end surface 10e and a fourth ridge 52 that is a portion connecting the top surface 10c and the second end surface 10f.

The reason why the curved ridge is provided in the outer periphery at the upper end of the laminated body 10 is that the ridge is rounded in a process of barrel-polishing a soft laminated body when the multilayer ceramic capacitor 1 is manufactured by the multilayer ceramic capacitor manufacturing method of the present preferred embodiment of the present invention (to be described below).

Referring to FIGS. 19A and 19B, when r1 is the curvature radius of the first ridge 41 on a plane (that is, the section in FIGS. 15 and 19A) that is parallel or substantially parallel to both the height direction H and the length direction L and includes the center position of inner layer C (that is, the section in FIGS. 15 and 19A), and r2 is the curvature radius of the second ridge 42 on a plane (that is, the section in FIGS. 15 and 19B) that is parallel or substantially parallel to both the height direction H and the length direction L and includes the center position of the inner layer C, the multilayer ceramic capacitor 1 preferably satisfies the conditions of r1≤50 μm and r2≤50 μm, for example (hereinafter, referred to as a condition 6).

When the condition 6 is satisfied, a volume of the inner layer C in the laminated body 10 is able to be substantially secured by an amount in which the inner layer C generating the capacitance comes close to the third ridge 51 of the laminated body 10 and an amount in which the inner layer C generating the capacitance comes close to the fourth ridge 52 of the laminated body 10. The multilayer ceramic capacitor 1 having the above configuration is able to be manufactured by the multilayer ceramic capacitor manufacturing method of the present preferred embodiment of the present invention (to be described below).

Thus, as compared with the conventional multilayer ceramic capacitor having the same size, the use of the multilayer ceramic capacitor 1 of the present preferred embodiment increases the volume of the inner layer C generating the capacitance, and achieves a large capacitance.

At this point, when the multilayer ceramic capacitor is manufactured by the multilayer ceramic capacitor manufacturing method of the comparative example (to be described below), the curvature radius of each of the first ridge and the second ridge of the inner layer is about 60 µm at the minimum.

Preferably the curvature radii r1 and r2 further preferably satisfy conditions of r1≤25 µm and r2≤25 µm, for example.

Referring to FIGS. 19A and 19B, when r3 is the curvature radius of the third ridge 51 on the plane (that is, the section in FIGS. 15 and 19A) that is parallel or substantially parallel to both the height direction H and the length direction L and includes the center position of inner layer C (that is, the section in FIGS. 15 and 19A), and r4 is the curvature radius of the fourth ridge 52 on the plane (that is, the section in FIGS. 15 and 19B) that is parallel or substantially parallel to both the height direction H and the length direction L and includes the center position of the inner layer C, the multilayer ceramic capacitor 1 preferably satisfies the conditions of r3≤50 µm and r4≤50 µm, for example (hereinafter, referred to as a condition 7).

When the condition 7 is satisfied, the inner layer C is able to be covered with the relatively thick dielectric layer 11 in the vicinity of the first ridge 41 and second ridge 42 while the first ridge 41 and the second ridge 42 of the inner layer C generating the capacitance are disposed close to the third ridge and the fourth ridge 52 of the laminated body 10, and reliability is able to be secured. The multilayer ceramic capacitor 1 having the above configuration is able to be manufactured by the multilayer ceramic capacitor manufacturing method of the present preferred embodiment of the present invention (to be described below).

At this point, when the multilayer ceramic capacitor is manufactured by the multilayer ceramic capacitor manufacturing method of the comparative example (to be described below), the curvature radius of each of the third ridge and the fourth ridge of the laminated body is typically set to about 60 µm at the minimum.

The curvature radii r1 to r4 may be measured by observing the ridges of the inner layer C and the ridges of the laminated body 10 with a microscope, the curvature radii of the ridges to be obtained, and the detailed measurement method will be described below.

Referring to FIG. 15, when L1A and L1B are the maximum value and the minimum value of a dimension L1 in the length direction L of the first end margin EM1 on the plane (that is, the section in FIG. 15) that is parallel or substantially parallel to both the height direction H and the length direction L and includes the center position of the inner layer C, respectively, the multilayer ceramic capacitor 1 preferably satisfies the condition of (L1A−L1B)/L1B≤0.2, for example (hereinafter, referred to as a condition 8-1).

Referring to FIG. 15, when L2A and L2B are the maximum value and the minimum value of a dimension L2 in the length direction L of the second end margin EM2 on the plane (that is, the section in FIG. 15) that is parallel or substantially parallel to both the height direction H and the length direction L and includes the center position of the inner layer C, respectively, the multilayer ceramic capacitor 1 preferably satisfies the condition of (L2A−L2B)/L2B≤0.2, for example (hereinafter, referred to as a condition 8-2).

Referring to FIG. 15, when H1A and H1B are the maximum value and the minimum value of a dimension in the height direction of the upper margin UM on the plane (that is, the section in FIG. 15) that is parallel or substantially parallel to both the height direction H and the length direction L and includes the center position of the inner layer C, respectively, the multilayer ceramic capacitor 1 preferably satisfies the condition of (H1A−H1B)/H1B≤0.2, for example (hereinafter, referred to as a condition 8-3).

When the conditions 8-1, 8-2, and 8-3 are satisfied, the multilayer ceramic capacitor 1 has a shape closer to a rectangular or substantially rectangular parallelepiped shape without having a shape that is largely curved like a barrel that moves away from the first end surface 10e and the second end surface 10f as the inner layer C comes close to the side of the top surface 10c and the side of the bottom surface 10d of the laminated body 10, so that the volume of the inner layer C in the laminated body 10 is able to be substantially secured by an amount in which the multilayer ceramic capacitor 1 has the shape closer to the rectangular or substantially rectangular parallelepiped shape. The multilayer ceramic capacitor 1 having the above configuration is able to be manufactured by the multilayer ceramic capacitor manufacturing method of the present preferred embodiment of the present invention (to be described below).

At this point, when the multilayer ceramic capacitor is manufactured by the multilayer ceramic capacitor manufacturing method of the comparative example (to be described below), each of a dimensional variation (that is, a left side value of an inequality indicated in the condition 8-1) in the length direction of the first end margin of the laminated body, a dimensional variation (that is, a left side value of an inequality indicated in the condition 8-2) in the length direction of the second end margin of the laminate body, and a dimensional variation (that is, a left side value of an inequality indicated in the condition 8-3) in the length direction of the upper margin of the laminated body is about 0.3 at the minimum.

More preferably, for example, the multilayer ceramic capacitor 1 satisfies the conditions of (L1A−L1B)/L1B≤0.1, (L2A−L2B)/L2B≤0.1, and (H1A−H1B)/H1B≤0.1, further preferably the multilayer ceramic capacitor 1 satisfies the conditions of (L1A−L1B)/L1B≤0.03, (L2A−L2B)/L2B≤0.03, and (H1A−H1B)/H1B≤0.03.

When L1C (L1C is not illustrated in FIG. 15) is a dimension in the length direction L in the center portion of the height direction H of the first end margin EM1 on the plane (that is, the section in FIG. 15) that is parallel or substantially parallel to both the height direction H and the length direction L and includes the center position of the inner layer C, preferably, the multilayer ceramic capacitor 1 satisfies the condition of L1C≤20 µm, for example (hereinafter, referred to as a condition 9-1).

Referring to FIG. 15, when L2C (L2C is not illustrated in FIG. 15) is a dimension in the length direction L in the central portion of the height direction H of the second end margin EM2 on the plane (that is, the section in FIG. 15) that is parallel or substantially parallel to both the height direction H and the length direction L and includes the center position of the inner layer C, preferably, the multilayer ceramic capacitor 1 satisfies the condition of L2C≤20 µm, for example (hereinafter, referred to as a condition 9-2).

Referring to FIG. 15, when H1C (H1C is not illustrated in FIG. 15) is a dimension in the height direction H in the central portion of the length direction L of the upper margin UM on the plane (that is, the section in FIG. 15) that is parallel or substantially parallel to both the height direction H and the length direction L and includes the center position of the inner layer C, preferably, the multilayer ceramic capacitor 1 satisfies the condition of H1C≤20 μm, for example (hereinafter, referred to as a condition 9-3).

When the conditions 9-1, 9-2, and 9-3 are satisfied, the first end margin EM1, the second end margin EM2, and the upper margin UM are sufficiently thinned as compared with the conventional first end margin EM1, second end margin EM2, and upper margin UM. As a result, the inner layer C has a shape closer to the rectangular or substantially rectangular parallelepiped shape, and the volume of the inner layer C in the laminated body 10 is able to be substantially secured by an amount in which the inner layer C has the shape closer to the rectangular or substantially rectangular parallelepiped shape. The multilayer ceramic capacitor 1 having the above configuration is able to be manufactured by the multilayer ceramic capacitor manufacturing method of the present preferred embodiment of the present invention (to be described below).

Referring to FIG. 15, when H2C (H2C is not illustrated in FIG. 15) is a dimension in the height direction H in the central portion of the length direction L of the lower margin LM on the plane (that is, the section in FIG. 15) that is parallel or substantially parallel to both the height direction H and the length direction L and includes the center position of the inner layer C, preferably, the multilayer ceramic capacitor 1 satisfies the condition of H2C≤40 μm, for example (hereinafter, referred to as a condition 9-4).

When the condition 9-4 is satisfied, both the dimension in the height direction H of the first extended region DR1 and the dimension in the height direction H of the second extended region DR2 is able to be sufficiently decreased as compared to the conventional dimensions, so that the equivalent series inductance (ESL) that is the parasitic inductance is able to be decreased. The multilayer ceramic capacitor 1 having the above configuration is able to be manufactured by the multilayer ceramic capacitor manufacturing method of the present preferred embodiment of the present invention (to be described below).

The section necessary for the measurement is exposed by polishing the multilayer ceramic capacitor, and the exposed section is observed with a microscope, which allows the measurement of the dimension and the curvature radius of each unit included in the various conditions. As described above, the curvature radius measuring method will be described in detail below.

In the multilayer ceramic capacitor 1 of the present preferred embodiment, by way of example, the maximum outer dimension W0 in the width direction W and the maximum outer dimension H0 in the height direction H are preferably equal or substantially equal to each other. Alternatively, the maximum outer dimension H0 in the height direction H and the maximum outer dimension W0 in the width direction W may satisfy the condition of (½)×W0≤H0≤W0, for example. With this configuration, a low-profile multilayer ceramic capacitor is obtained, mechanical strength of the multilayer ceramic capacitor itself is increased, and the interference of the multilayer ceramic capacitor with a shield plate is able to be prevented when the shield plate covers the wiring board on which the multilayer ceramic capacitor is mounted.

The maximum outer dimension H0 in the height direction H and the maximum outer dimension W0 in the width direction W may satisfy the condition of W0≤H0≤2×W0, for example. With this configuration, a high-profile multilayer ceramic capacitor is able to be obtained, and the capacitance is able to be significantly increased.

Multilayer Ceramic Capacitor Manufacturing Method of Comparative Example

Hereinafter, prior to describing the method for producing a multilayer ceramic capacitor in the present preferred embodiment of the present invention, a method for producing a the multilayer ceramic capacitor manufacturing method of the comparative example will be described below. The multilayer ceramic capacitor manufacturing method of the comparative example is a general method of manufacturing the conventional multilayer ceramic capacitor in which a plurality of internal electrode layers are laminated in a direction parallel or substantially parallel to the mounting surface.

The following multilayer ceramic capacitor manufacturing method of the comparative example is a method of simultaneously mass-producing a plurality of multilayer ceramic capacitors in which the mother laminated body is prepared by collectively performing the processing to a middle stage of a manufacturing process, the mother laminated body is divided into pieces, and the processing is further performed on the soft laminated body after being divided.

First, ceramic slurry is prepared. Specifically, ceramic powders, a binder, a solvent, and the like are mixed at a predetermined mixing ratio to form the ceramic slurry.

Subsequently, a ceramic green sheet is formed. Specifically, the ceramic slurry is formed into a sheet shape on a carrier film using a die coater, a gravure coater, a microgravure coater, or the like to form the ceramic green sheet.

Subsequently, a mother sheet is formed. Specifically, a conductive paste is printed on the ceramic green sheet by, for example, a screen printing method, a gravure printing method, or the like so as to have a predetermined pattern, thus forming a mother sheet in which the predetermined pattern is provided on the ceramic green sheet. In addition to the mother sheet having the conductive pattern, a ceramic green sheet on which the conductive pattern is not formed is also prepared as the mother sheet.

Subsequently, the mother sheet is laminated. Specifically, a predetermined number of mother sheets on which the conductive pattern is not formed are laminated, a plurality of mother sheets on which the conductive pattern is formed are sequentially laminated on the predetermined number of mother sheets, and a predetermined number of mother sheets on which the conductive pattern is not formed are further laminated on the plurality of mother sheets, thus forming a mother sheet group.

Subsequently, the mother sheet group is pressure-bonded. Specifically, the mother sheet group is pressed and pressure-bonded along the laminating direction and pressed by isostatic pressing or a rigid body pressing, for example, thus forming a mother laminated body.

Subsequently, the mother laminated body is divided. Specifically, the mother laminated body is divided into a matrix by push cutting or dicing, for example, and divided into a plurality of soft laminated bodies.

Subsequently, the soft laminate is then barrel polished. Specifically, the soft laminated body is enclosed in a barrel together with a media ball harder than that of the ceramic material, and the corners and ridges of the soft laminate are rounded by rotating the barrel.

Subsequently, the soft laminated body is fired. Specifically, the soft laminated body is heated to a predetermined temperature, and fired to form a laminated body.

Subsequently, the first external electrode and the second external electrode are formed on the bottom surface of the laminated body. Specifically, the underlying electrode layer is formed by various thin film forming methods, various printing methods or dipping methods, or the like, and a plating layer is formed by plating so as to cover the underlying electrode layer, thus forming the first external electrode and the second external electrode.

A large number of multilayer ceramic capacitors in which a plurality of internal electrode layers are laminated in the direction parallel or substantially parallel to the mounting surface are simultaneously manufactured through the series of processes.

Figure 20:
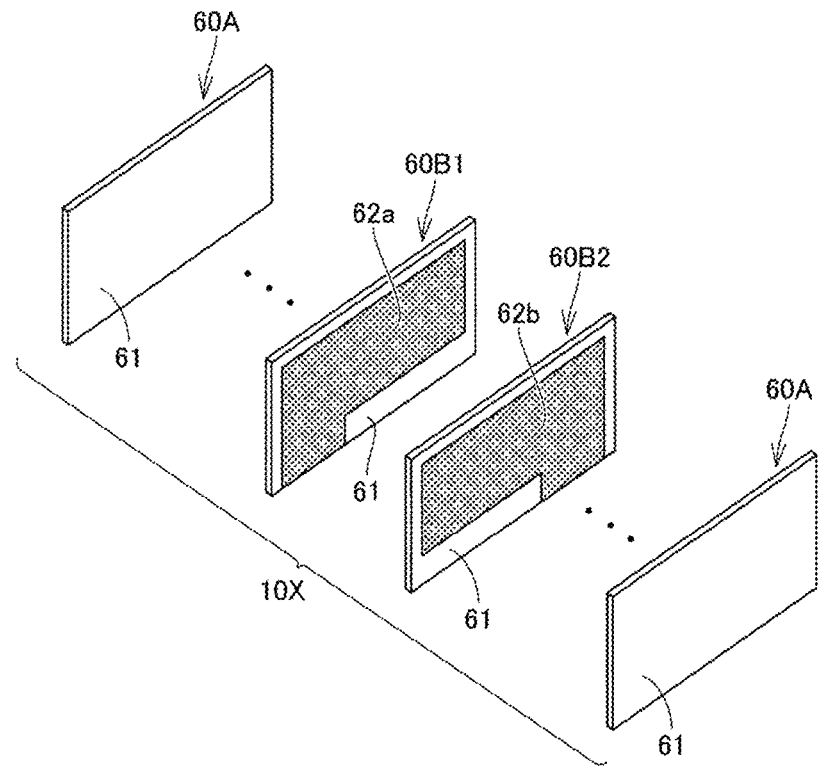
FIG. 20 is an exploded view schematically illustrating a laminated structure of the laminated body formed in a multilayer ceramic capacitor manufacturing method according to a comparative example.

Laminated Structure of Laminated Body in the Case Multilayer Ceramic Capacitor Manufacturing Method of Comparative Example FIG. 20 is an exploded view schematically illustrating the laminated structure of the laminated body in the case of the multilayer ceramic capacitor manufacturing method of the comparative example. The laminated structure of the laminated body 10X in the case of the multilayer ceramic capacitor manufacturing method of the comparative example will be described below with reference to FIG. 20.

As described above, when the multilayer ceramic capacitor is manufactured by the multilayer ceramic capacitor manufacturing method of the comparative example, the processing is collectively performed to the middle stage of the manufacturing process. For this reason, as illustrated in FIG. 20, the mother sheets are not laminated while the mother sheets are individually divided. However, for the sake of easy understanding, the mother sheet is illustrated as being individually divided.

As illustrated in FIG. 20, a laminated body 10X is configured by laminating and pressure-bonding a plurality of mother sheets 60A, 60B1, 60B2 having different configurations in a predetermined order.

The mother sheet 60A is made only of a ceramic green sheet 61 on which the conductive pattern is not formed. The mother sheet 60A mainly includes the dielectric layer in a portion included in each of the first side margin and the second side margin of the laminated body 10X.

The mother sheets 60B1, 60B2 are obtained by forming conductive patterns 62a, 62b having a predetermined shape on the surface of the ceramic green sheet 61.

The conductive pattern 62a of the mother sheet 60B1 is formed so as to reach a part of the portion that constitutes the bottom surface of the laminated body 10X, and constitutes the first internal electrode layer of the laminated body 10X.

The conductive pattern 62b in the mother sheet 60B2 is formed so as to extend to a portion of the bottom surface of the laminated body 10X, and defines the second internal electrode layer of the laminated body 10X.

The ceramic green sheet 61 in the mother sheets 60B1, 60B2 mainly defines the dielectric layer in the portion included in the inner layer of the laminated body 10X and the dielectric layer in the portion included in each of the upper margin, the lower margin, the first end margin, and the second end margin.

The conductive patterns 62a, 62b are exposed only in a portion of the bottom surface of the laminated body 10X formed by laminating and pressure-bonding the plurality of mother sheets 60A, 60B1, 60B2 having different configurations in a predetermined order.

At this point, pressure is applied to the laminated body 10X having the laminated structure in the laminating direction of the mother sheets 60A, 60B1, 60B2 (that is, the direction that is the width direction of the laminated body 10X) during the pressure bonding. Consequently, the laminated mother sheets 60A, 60B1, 60B2 are considerably deformed.

At this point, a portion (that is, a portion defining the inner layer) where the conductive patterns 62a, 62b are densely disposed along the laminating direction, a portion (that is, a portion defining the first extended region and the second extended region of the lower margin) where the conductive patterns 62a, 62b are sparsely disposed along the laminating direction, and a portion (that is, a portion excluding the portion defining the upper margin, the first end margin, and the second portion and the portion defining the first extended region and the second extended region of the lower margin) where the conductive patterns 62a, 62b do not exist along the laminating direction are different from one another in a deformation manner. This is because while the relatively soft ceramic green sheet 61 easily flows, the relatively hard conductive patterns 62a, 62b does not substantially flow although they are deformed so as to be curved or to be spread out.

For this reason, in particular, the conductive patterns 62a, 62b are largely curved at the boundary between the portion where the conductive patterns 62a, 62b are densely disposed along the laminating direction and the portion where the conductive patterns 62a, 62b do not exist along the laminating direction (that is, the portion defining the boundary between the inner layer and the upper margin, the lower margin, the first end margin and the second end margin), such that the corner and the ridge of the inner layer are curved with a large curvature radius.

Thus, when the multilayer ceramic capacitor is manufactured by the multilayer ceramic capacitor manufacturing method of the comparative example, because the corner and the ridge of the inner layer have a largely curved shape, it is necessary to previously design the relatively small conductive pattern in consideration of the largely curved shapes of the corner and the ridge. Due to the relatively small conductive pattern, the sectional area of the first extended region and the sectional area of the second extended region are reduced, such that the equivalent series resistance is increased or the volume of the inner layer is relatively decreased to decrease the capacitance.

Multilayer Ceramic Capacitor Manufacturing Method of Preferred Embodiment of the Present Invention The multilayer ceramic capacitor manufacturing method of the present preferred embodiment of the present invention will be described below. The multilayer ceramic capacitor manufacturing method of the present preferred embodiment is a method of simultaneously mass-producing a plurality of multilayer ceramic capacitors in which the mother laminated body is prepared by collectively performing the processing to a middle stage of a manufacturing process, the mother laminated body is divided into pieces, and the processing is further performed on the soft laminating element after being divided.

First, ceramic slurry is prepared. Specifically, ceramic powders, a binder, a solvent, and the like are mixed at a predetermined mixing ratio to form the ceramic slurry.

Subsequently, a ceramic green sheet is formed. Specifically, the ceramic slurry is formed into a sheet shape on a carrier film using, for example, a die coater, a gravure coater, a micro-gravure coater, or the like to form the ceramic green sheet.

Subsequently, a mother sheet is formed. Specifically, a conductive paste is printed on the ceramic green sheet by, for example, a screen printing method, a gravure printing method, or the like so as to have a predetermined pattern, thus forming a mother sheet in which the predetermined pattern is provided on the ceramic green sheet. In addition to the mother sheet having the conductive pattern, the ceramic green sheet on which the conductive pattern is not formed is also prepared as the mother sheet.

Although not described in detail here, the shape of the conductive pattern formed on the ceramic green sheet in the above process is different from that in the multilayer ceramic capacitor manufacturing method of the comparative example.

Subsequently, the mother sheet is laminated. Specifically, a predetermined number of mother sheets on which the conductive pattern is not formed are laminated, a plurality of mother sheets on which the conductive pattern is formed are sequentially laminated on the predetermined number of mother sheets, and a predetermined number of mother sheets on which the conductive pattern is not formed are further laminated on the plurality of mother sheets, thus forming a mother sheet group.

Subsequently, the mother sheet group is pressure-bonded. Specifically, the mother sheet group is pressed and pressure-bonded along the laminating direction and pressed by isostatic pressing or a rigid body pressing, for example, thus forming a mother laminated body.

Subsequently, the mother laminated body is divided. Specifically, the mother laminated body is divided into a matrix by push cutting or dicing, for example, and divided into a plurality of soft laminating elements.

Subsequently, the covering ceramic green sheet defining the covering dielectric layer is bonded to the soft laminating element. The bonded covering ceramic green sheet is made only of the ceramic green sheet on which the conductive pattern is not formed. Specifically, the covering ceramic green sheet is attached to each of the outer surface on the top surface side of the soft laminating element to be located on the side of the top surface $10c$ of the laminated body $10$, the outer surface on the first end surface side of the soft laminating element to be located on the side of the first end surface $10e$ of the laminated body $10$, and the outer surface on the second end surface side of the soft laminating element to be located on the side of the second end surface $10f$ of the laminated body $10$.

For example, the covering ceramic green sheet having a shape larger than the outer surface of the soft laminating element is placed on an elastic body, the soft laminating element is pressed against the covering ceramic green sheet placed on the elastic body, and the covering ceramic green sheet is punched out by the soft laminating element, which allows the bonding. Consequently, the soft laminated body, which is made of the soft laminating element in which the covering ceramic green sheet is bonded to a predetermined portion, is formed.

The bonding order of the covering ceramic green sheets attached to the outer surface on the upper surface side, the outer surface on the first end surface side, and the outer surface on the second end surface side of the soft laminating element is not particularly limited, but the covering ceramic green sheets may preferably be attached to the outer surface on the upper surface side, the outer surface on the first end surface side, and the outer surface on the second end surface side in any order.

Subsequently, the soft laminate is barrel polished. Specifically, the soft laminated body is enclosed in a barrel together with a media ball harder than that of the ceramic material, and the corners and ridges of the soft laminate are rounded by rotating the barrel.

Although not described in detail here, the roundness added to the corner and the ridge of the soft laminated body in the above process is smaller than the roundness added to the corner and the ridge of the soft laminated body in the multilayer ceramic capacitor manufacturing method of the comparative example.

Subsequently, the soft laminated body is fired. Specifically, the soft laminated body is heated to a predetermined temperature, and fired to form the laminated body $10$.

Subsequently, the first external electrode $21$ and the second external electrode $22$ are formed on the bottom surface $10d$ of the laminated body $10$. Specifically, the plating is performed such that the first exposed portion $31$ of the first extended region DR1 and the second exposed portion $32$ of the second extended region DR2 that are exposed in the bottom surface $10d$ of the laminated body $10$ are directly covered with the plating layer. Alternatively, after the underlying electrode layer is formed by, for example, various thin film forming methods, various printing methods or dipping methods, or the like, the plating layer is formed by the plating so as to cover the underlying electrode layer, such that the first external electrode $21$ and the second external electrode $22$ may be formed.

The large number of multilayer ceramic capacitors $1$ of the present preferred embodiment of the present invention are simultaneously manufactured through the series of processes.

Figure 21:
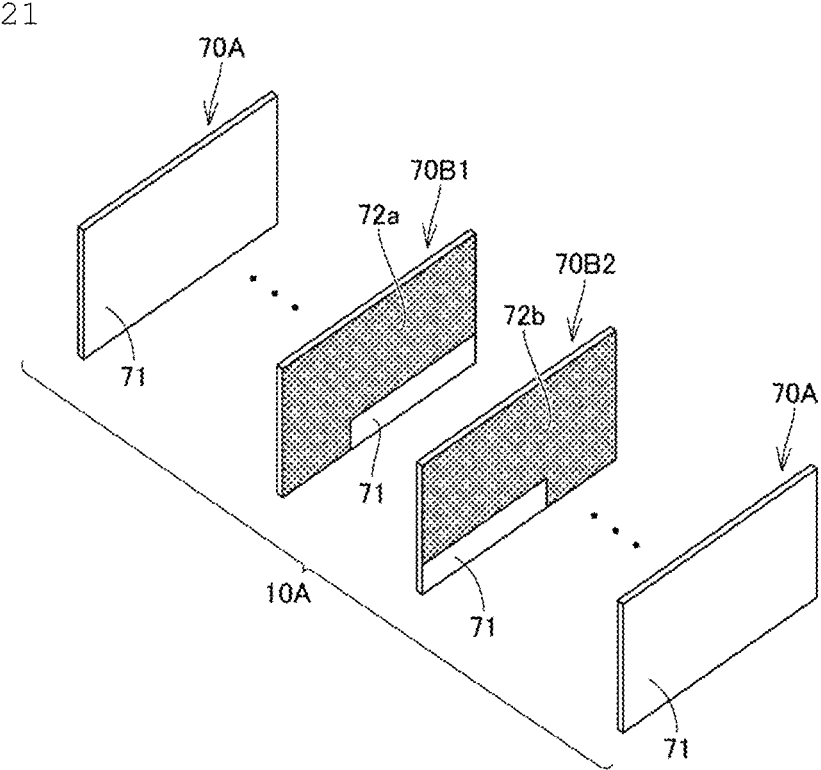
FIG. 21 is an exploded view schematically illustrating the laminated structure of the laminated body formed in a multilayer ceramic capacitor manufacturing method according to a preferred embodiment of the present invention.
Figure 22:
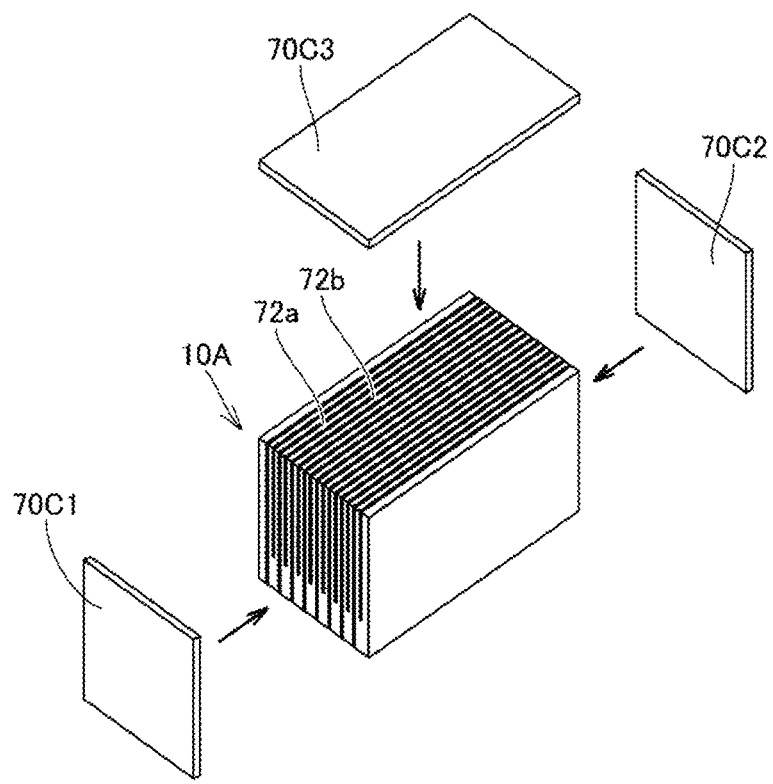
FIG. 22 is an exploded view schematically illustrating the laminated structure of the laminated body formed in a multilayer ceramic capacitor manufacturing method according to a preferred embodiment of the present invention.

Laminated Structure of Laminated Body in the Case of the Multilayer Ceramic Capacitor Manufacturing Method of the Present Preferred Embodiment FIGS. 21 and 22 are exploded views schematically illustrating the laminated structure of the laminated body in the case of the multilayer ceramic capacitor manufacturing method of the present preferred embodiment of the present invention. The laminated structure of the laminated body $10$ of the multilayer ceramic capacitor $1$ of the present preferred embodiment will be described below with reference to FIGS. 21 and 22.

As described above, when the multilayer ceramic capacitor $1$ is manufactured by the multilayer ceramic capacitor manufacturing method of the present preferred embodiment, the processing is collectively performed to the middle stage of the manufacturing process. For this reason, as illustrated in FIGS. 21 and 22, the mother sheets are not laminated while the mother sheets are individually divided. However, for the sake of easy understanding, the mother sheet is illustrated after being divided.

As illustrated in FIGS. 21 and 22, a plurality of mother sheets 70A, 70B1, 70B2 having different configurations are laminated and pressure-bonded in a predetermined order to form a laminating element 10A, and the covering ceramic green sheets 70C1, 70C2, 70C3 are bonded to the laminating element 10A, such that the laminated body $10$ is formed.

The mother sheet 70A is made only of a ceramic green sheet 71 in which the conductive pattern is not formed on the surface. The mother sheet 70A mainly includes the dielectric layer 11 in a portion included in each of the first side margin SM1 and the second side margin SM2 of the laminated body 10.

In the mother sheets 70B1, 70B2, conductive patterns 72a, 72b having a predetermined shape are formed on the surface of the ceramic green sheet 71.

The conductive pattern 72a of the mother sheet 70B1 is formed so as to extend to each of a portion of the outer surface on the bottom surface side of the laminating element 10A in a portion defining the bottom surface 10d of the laminated body 10, the outer surface on the top surface side of the laminating element 10A to be located on the side of the top surface 10c of the laminated body 10, the outer surface on the first end surface side of the laminating element 10A to be located on the side of the first end surface 10e of the laminated body 10, and the outer surface on the second end surface side of the laminating element 10A to be located on the side of the second end surface 10f of the laminated body 10, and the conductive pattern 72a defines the first internal electrode layer 12a of the laminated body 10.

The conductive pattern 72b of the mother sheet 70B2 is formed so as to extend to each of a portion of the outer surface on the bottom surface side of the laminating element 10A in a portion defining the bottom surface 10d of the laminated body 10, the outer surface on the top surface side of the laminating element 10A to be located on the side of the top surface 10c of the laminated body 10, the outer surface on the first end surface side of the laminating element 10A to be located on the side of the first end surface 10e of the laminated body 10, and the outer surface on the second end surface side of the laminating element 10A to be located on the side of the second end surface 10f of the laminated body 10, and the conductive pattern 72b defines the second internal electrode layer 12b of the laminated body 10.

The ceramic green sheet 71 in the mother sheets 70B1, 70B2 mainly includes the dielectric layer 11 in the portion included in the inner layer C of the laminated body 10 and the dielectric layer 11 in the portion included in the lower margin LM.

The conductive patterns 72a, 72b are exposed in a portion of each of the outer surface on the bottom surface side, the outer surface on the top surface side, the outer surface on the first end surface side, and the outer surface on the second end surface side of the laminating element 10A provided by laminating and pressure-bonding the plurality of mother sheets 70A, 70B1, 70B2 having different configurations in predetermined order.

The covering ceramic green sheets 70C1, 70C2 are bonded to the outer surface on the first end surface side and the outer surface on the second end surface side of the laminating element 10A, respectively. Consequently, the conductive patterns 72a, 72b exposed to the outer surface on the first end surface side and the outer surface on the second end surface side of the laminating element 10A are covered with the covering ceramic green sheets 70C1, 70C2.

A covering ceramic green sheet 70C3 is bonded to the outer surface on the upper surface side of the laminating element 10A. Consequently, the conductive patterns 72a, 72b exposed to the outer surface on the top surface side of the laminating element 10A are covered with the covering ceramic green sheet 70C3.

At this point, the pressure is applied to the laminated body 10 having the laminated structure in the laminating direction of the mother sheets 70A, 70B1, 70B2 (that is, the direction that is the width direction of the laminated body 10) during the pressure bonding of the laminating element 10A. Consequently, the laminated mother sheets 70A, 70B1, 70B2 are considerably deformed.

At this point, a portion (that is, the portion defining the inner layer C) where the conductive patterns are densely disposed along the laminating direction, a portion (that is, the portion defining the first extended region DR1 and the second extended region DR2 of the lower margin LM) where the conductive patterns are sparsely disposed along the laminating direction, and a portion (that is, the portion excluding the portion defining the first extended region DR1 and the second extended region DR2 of the lower margin LM) where the conductive patterns do not exist along the laminating direction are different from one another in the deformation manner. However, the laminating element 10A does not include the portions defining the upper margin UM, the first end margin EM1, and the second end margin EM2, so that the corner and the ridge of the inner layer C are not curved with a large curvature radius.

Thus, because the corner and the ridge of the inner layer C are not largely curved by manufacturing the multilayer ceramic capacitor by the multilayer ceramic capacitor manufacturing method of the present preferred embodiment, the inner layer C has a rectangular or substantially rectangular parallelepiped shape, and as a result, the increase in the equivalent series resistance due to the relative enlargement of the sectional area of the first extended region DR1 and the sectional area of the second extended region DR2 is able to be prevented, or the capacitance is increased by the relative increase in the volume of the inner layer C.

Manufacturing Example 1

Figure 23:
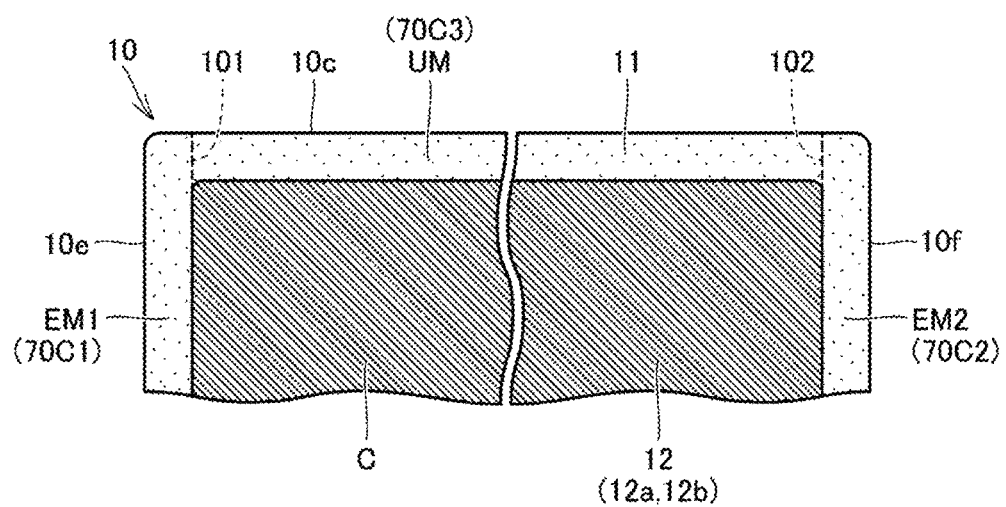
FIG. 23 is an enlarged schematic sectional view illustrating a main portion of a multilayer ceramic capacitor according to a manufacturing example 1.

FIG. 23 is an enlarged schematic sectional view illustrating a main portion of a multilayer ceramic capacitor according to a manufacturing example 1. While the multilayer ceramic capacitor of the manufacturing example 1 is manufactured by the multilayer ceramic capacitor manufacturing method of the present preferred embodiment of the present invention, the outer surface on the upper surface side of the soft laminating element is first formed so as to be covered with the covering ceramic green sheet 70C3, and then the outer surface on the first end surface side and the outer surface on the second end surface side of the soft laminating element are formed so as to be covered with the covering ceramic green sheet 70C1 and the covering ceramic green sheet 70C2.

In the multilayer ceramic capacitor of the manufacturing example 1 formed in this manner, a bonding surface between the covering ceramic green sheet 70C1 and the covering ceramic green sheet 70C3 exists at a position on an extended line of the boundary between the inner layer C and the first end margin EM1, and a bonding surface between the covering ceramic green sheet 70C2 and the covering ceramic green sheet 70C3 exists at a position on an extended line of the boundary between the inner layer C and the second end margin EM2.

As illustrated in FIG. 23, when viewed in the section parallel or substantially parallel to both the height direction H and the length direction L, the bonding surface between the covering ceramic green sheet 70C1 and the covering ceramic green sheet 70C3 in the bonding surfaces exists at the position on the side of the top surface 10c of the boundary between the inner layer C and the first end margin EM1 (the position of the bonding surface is schematically illustrated by a broken line 101), and the bonding surface of the covering ceramic green sheet 70C2 and the covering ceramic green sheet 70C3 exists at the position on the side of the top surface 10c of the boundary between the inner layer C and the second end margin EM2 (the position of the bonding surface is schematically illustrated by a broken line 102).

Although these bonding surfaces do not define a clear interface after the firing of the soft laminated body, in the region in the vicinity of the bonding surface, the number of pores included in the dielectric layer 11 tends to increase as compared to other portions. Specifically, the region is polished so as to be exposed, and the region is observed with an optical microscope or the like to measure porosity. In this case, the porosity in the range of a 10-μm square is about 1% to about 10%, for example.

A minute step is often generated on the outer surface of the laminated body 10 at the position corresponding to the bonding surface. The step is caused by the generation of the deformation of the covering ceramic green sheet 70C3 already bonded to the soft laminating element in bonding the covering ceramic green sheets 70C1, 70C2 to the soft laminating element. The illustration of the step is omitted in FIG. 23.

As in the multilayer ceramic capacitor of the manufacturing example 1, the outer surface on the upper surface side of the soft laminating element is first formed so as to be covered with the covering ceramic green sheet 70C3, and then the outer surface on the first end surface side and the outer surface on the second end surface side of the soft laminating element are formed so as to be covered with the covering ceramic green sheet 70C1 and the covering ceramic green sheet 70C2. In this case, the manufacturing is able to be more easily performed. This is because the number of times of rolling is able to be reduced or minimized although it is necessary to roll the soft laminating element for the purpose of the bonding (that is, the soft laminating element is rotated in order to change the surface on which the soft laminating element is held on a bonding device or a bonding jig).

Manufacturing Example 2

Figure 24:
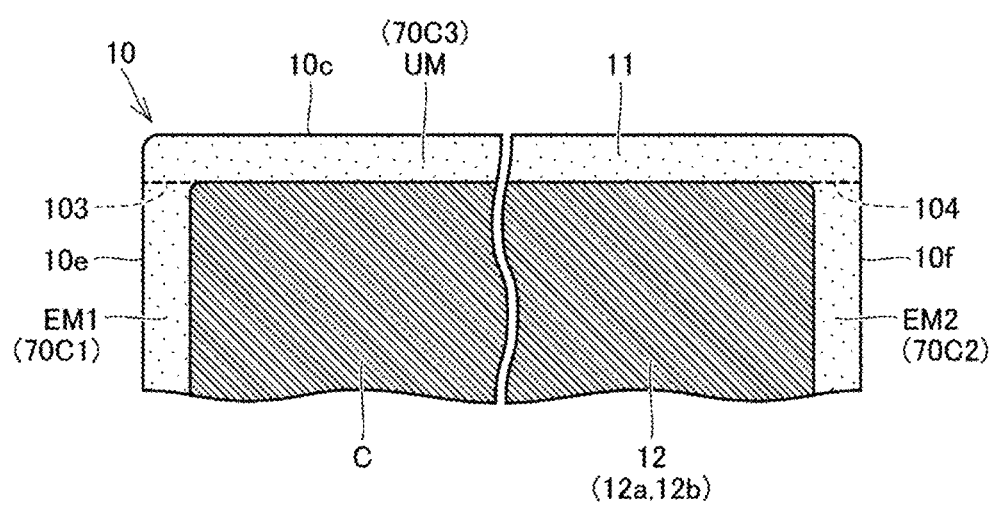
FIG. 24 is an enlarged schematic sectional view illustrating a main portion of a multilayer ceramic capacitor according to a manufacturing example 2.

FIG. 24 is an enlarged schematic sectional view illustrating a main portion of a multilayer ceramic capacitor according to a manufacturing example 2. While the multilayer ceramic capacitor of the manufacturing example 2 is manufactured by the multilayer ceramic capacitor manufacturing method of the preferred embodiment of the present invention, the outer surface on the first end surface side and the outer surface on the second end surface side of the soft laminating element are first formed so as to be covered with the covering ceramic green sheet 70C1 and the covering ceramic green sheet 70C2, and then the outer surface on the top surface side of the soft laminating element is formed so as to be covered with the covering ceramic green sheet 70C3.

In the multilayer ceramic capacitor of the manufacturing example 2 formed in this manner, the bonding surface between the covering ceramic green sheet 70C1 and the covering ceramic green sheet 70C3 exists at the position on the extended line of the boundary between the inner layer C and the upper margin UM, and the bonding surface between the covering ceramic green sheet 70C2 and the covering ceramic green sheet 70C3 exists at the position on the extended line of the boundary between the inner layer C and the upper margin UM.

As illustrated in FIG. 24, when viewed in the section parallel or substantially parallel to both the height direction H and the length direction L, the bonding surface between the covering ceramic green sheet 70C1 and the covering ceramic green sheet 70C3 in the bonding surfaces exists at the position on the side of the first end surface 10e of the boundary between the inner layer C and the upper margin UM (the position of the bonding surface is schematically illustrated by a broken line 103), and the bonding surface of the covering ceramic green sheet 70C2 and the covering ceramic green sheet 70C3 exists at the position on the side of the second end surface 10f of the boundary between the inner layer C and the upper margin UM (the position of the bonding surface is schematically illustrated by a broken line 104).

Although these bonding surfaces do not define a clear interface after the firing of the soft laminated body, in the region in the vicinity of the bonding surface, the number of pores included in the dielectric layer 11 tends to increase as compared with other portions. Specifically, the region is polished so as to be exposed, and the region is observed with an optical microscope or the like to measure porosity. In this case, the porosity in the range of a 10-μm square is about 1% to about 10%, for example.

A minute step is often generated on the outer surface of the laminated body 10 at the position corresponding to the bonding surface. The step is caused by the generation of the deformation of the covering ceramic green sheets 70C1, 70C2 already bonded to the soft laminating element in bonding the covering ceramic green sheet 70C3 to the soft laminating element. The illustration of the step is omitted in FIG. 24.

As in the multilayer ceramic capacitor of the manufacturing example 2, the outer surface on the first end surface side and the outer surface on the second end surface side of the soft laminating element are first formed so as to be covered with the covering ceramic green sheet 70C1 and the covering ceramic green sheet 70C2, and then the outer surface on the top surface side of the soft laminating element is formed so as to be covered with the covering ceramic green sheet 70C3. In this case, the generation of a crack in the dielectric layer 11 is able to be prevented in firing the soft laminating element. This is attributed to the following fact. That is, when the covering ceramic green sheets 70C1, 70C2 are first bonded to the outer surface on the first end surface side and the outer surface on the second end surface side of the soft laminating element, which are the surface on which a deformation amount generated in the covering ceramic green sheet to be bonded becomes larger during the bonding, forces easily act in the direction parallel or substantially parallel to the bonding surface in bonding the covering ceramic green sheet 70C3 to the outer surface on the top surface side of the soft laminating element, and as a result, the generation of the crack is able to be prevented in the bonding surface during the firing.

Example

Multilayer ceramic capacitors of preferred embodiments according to examples 1 to 12 will be described below. The multilayer ceramic capacitors of the examples 1 to 12 are all manufactured by the multilayer ceramic capacitor manufacturing method of the present preferred embodiment, and the specific structure thereof is the same or similar to the multilayer ceramic capacitor of the above-described preferred embodiment. FIGS. 25 to 28 are tables illustrating the specifications of the multilayer ceramic capacitors of the examples 1 to 12, and the dimensions and the like of each unit are all design values.

As illustrated in FIG. 25, each of the multilayer ceramic capacitors of the examples 1 to 3 is, for example, 1608 size (that is, a standard product having the maximum outer dimension L0 in the length direction L of about 1.6 mm and the maximum outer dimension W0 in the width direction W and the maximum outer dimension H0 in the height direction H of about 0.8 mm). In the multilayer ceramic capacitors of the examples 1 to 3, a dielectric constant ε [F/m], a volume capacity, and an effective volume vary by changing the thickness of the dielectric layer and the thickness of the internal electrode layer.

As illustrated in FIG. 26, the multilayer ceramic capacitors of the examples 4 to 6 are, for example, 1005 size (that is, a standard product having the maximum outer dimension L0 in the length direction L of about 1.0 mm and the maximum outer dimension W0 in the width direction W and the maximum outer dimension H0 in the height direction H of about 0.5 mm). In the multilayer ceramic capacitors of the examples 4 to 6, the dielectric constant ε [F/m], the volume capacity, and the effective volume vary by changing the thickness of the dielectric layer and the thickness of the internal electrode layer.

As illustrated in FIG. 27, the multilayer ceramic capacitors of the examples 7 to 9 are, for example, 0603 size (that is, a standard product having the maximum outer dimension L0 in the length direction L of about 0.6 mm and the maximum outer dimension W0 in the width direction W and the maximum outer dimension H0 in the height direction H of about 0.3 mm). In the multilayer ceramic capacitors of the examples 7 to 9, the dielectric constant ε [F/m], the volume capacity, and the effective volume vary by changing the thickness of the dielectric layer and the thickness of the internal electrode layer.

As illustrated in FIG. 28, each of the multilayer ceramic capacitors of the examples 10 to 12 is, for example, 0402 size (that is, a standard product having the maximum outer dimension L0 in the length direction L of about 0.4 mm and the maximum outer dimension W0 in the width direction W and the maximum outer dimension H0 in the height direction H of about 0.2 mm). In the multilayer ceramic capacitors of the examples 10 to 12, the dielectric constant ε [F/m], the volume capacity, and the effective volume vary by changing the thickness of the dielectric layer and the thickness of the internal electrode layer.

"The thickness in the central portion of the first end margin" in FIGS. 25 to 28 is the same as to the dimension L1C in the length direction L in central portion in the height direction H of the first end margin EM1 on the plane that is parallel or substantially parallel to both the height direction H and the length direction L and includes the center position of the inner layer C described above with reference to FIG. 15, and "the thickness of the central portion of the second end margin" is the same as the dimension L2C in the length direction L in the central portion in the height direction H of the second end margin EM2 on the plane that is parallel or substantially parallel to both the height direction H and the length direction L and includes the center position of the inner layer C described above with reference to FIG. 15.

"The thickness in the central portion of the upper margin" in FIGS. 25 to 28 is the same as the dimension H1C in the height direction H in the central portion in the length direction L of the upper margin UM on the plane that is parallel or substantially parallel to both the height direction H and the length direction L and includes the center position of the inner layer C described above with reference to FIG. 15, and "the thickness of the central portion of the lower margin" is the same as the dimension H2C in the height direction H in the central portion in the length direction L of the lower margin LM on the plane that is parallel or substantially parallel to both the height direction H and the length direction L and includes the center position of the inner layer C described above with reference to FIG. 15.

As illustrated in FIG. 25, in the multilayer ceramic capacitors of the examples 1 to 3 have the capacitances of about 176.0 μF, about 137.8 μF, and about 100.6 μF, respectively. That is, the capacitance greater than or equal to about 100.6 μF is able to be obtained in the 1608-size multilayer ceramic capacitor.

As illustrated in FIG. 26, the multilayer ceramic capacitors of the examples 4 to 6 have the capacitances of about 55.8 μF, about 43.0 μF, and about 30.6 μF, respectively. That is, the capacitance greater than or equal to about 30.6 μF is able to be obtained in the 1005-size multilayer ceramic capacitor.

As illustrated in FIG. 27, the multilayer ceramic capacitors of the examples 7 to 9 have the capacitances of about 9.91 μF, about 7.34 μF, and about 4.86 μF, respectively. That is, the capacitance greater than or equal to about 4.86 μF is able to be obtained in the 0603-size multilayer ceramic capacitor.

As illustrated in FIG. 28, the multilayer ceramic capacitors of the examples 10 to 12 have the capacitances of about 1.75 μF, about 1.20 μF, and about 0.69 μF, respectively. That is, the capacitance greater than or equal to about 0.69 μF is able to be obtained in the 0402-size multilayer ceramic capacitor.

In the multilayer ceramic capacitor having each size, preferably the thickness of the dielectric layer is less than or equal to about 0.48 μm, for example, in order to obtain the capacitance as described above. Preferably, the thickness of the internal electrode layer is less than or equal to about 0.35 μm, for example. Preferably, the dielectric constant is less than or equal to about 3500 F/m, for example. Preferably, each of the thickness in the central portion of the first end margin and the thickness in the central portion of the second end margin is less than or equal to about 20 μm, for example. Preferably, the thickness in the center portion of the upper margin is less than or equal to about 20 μm, for example. Preferably, the thickness in the center portion of the lower margin is less than or equal to about 40 μm, for example.

Method of Measuring Curvature Radius

Figure 29:
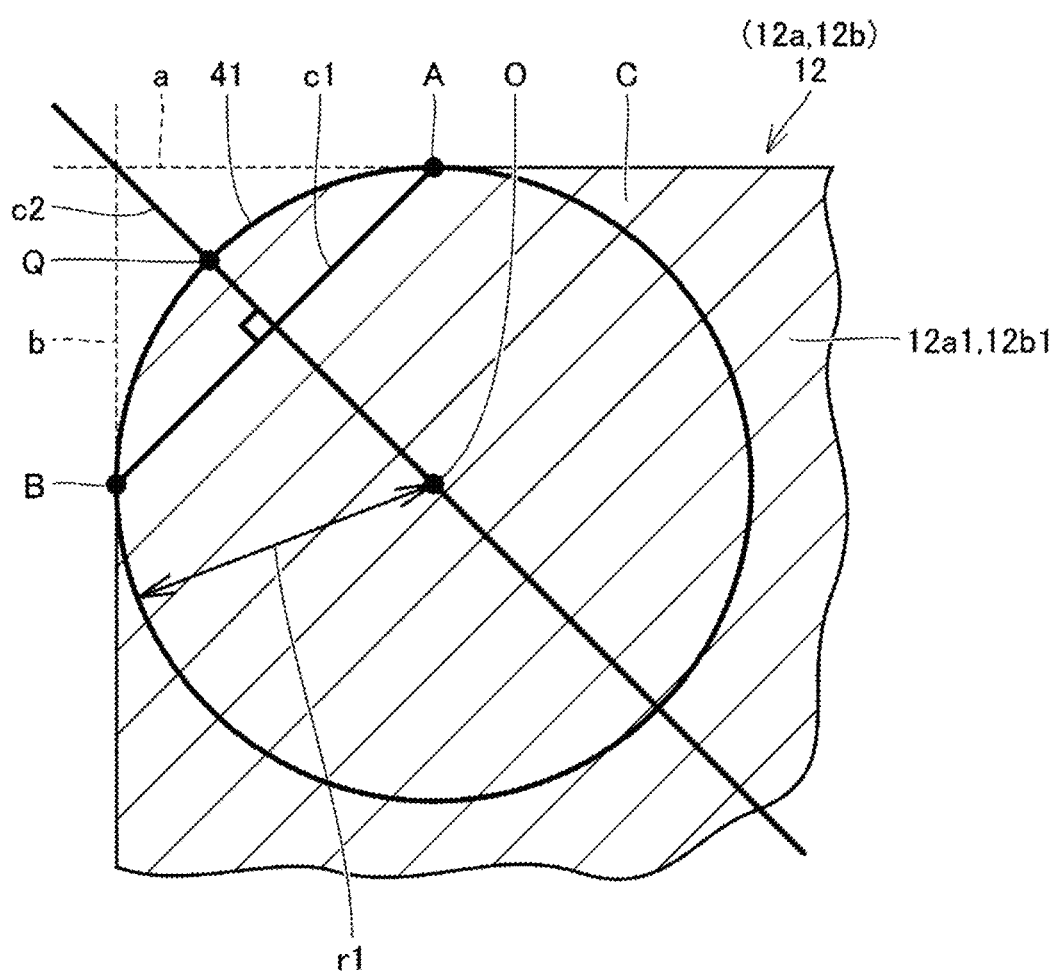
FIG. 29 is a schematic diagram illustrating a method of measuring a curvature radius r1.

As described above, the curvature radii R1 to R8, r1 to r4 may be measured by observing each unit of the multilayer ceramic capacitor with a microscope. The detailed measurement method will be described below based on the case that the curvature radius r1 of the first ridge 41 of the inner layer C is measured. FIG. 29 is a schematic diagram illustrating a method of measuring the curvature radius r1.

As illustrated in FIG. 29, in measuring the curvature radius r1 of the first ridge 41 of the inner layer C, the multilayer ceramic capacitor is polished to expose the plane that is parallel or substantially parallel to both the height direction H and the length direction L and includes the center position of the inner layer C, an enlarged image in the portion including the first ridge 41 of the inner layer C is acquired using a microscope, and arithmetic processing is performed based on the acquired enlarged image. A digital microscope manufactured by Keyence Corporation, for example, is preferably used as the microscope.

Specifically, first, a boundary point A between one of the two sides adjacent to the first ridge 41 of the inner layer C and the first ridge 41 is specified. Specifically, a straight line a is drawn along one side, and an end point near the first ridge 41 in a portion where the straight line a and a contour line of the inner layer C overlap each other is specified, and the end point is set to the boundary point A.

Subsequently, a boundary point B between the first ridge 41 and the other side different from one of the two sides adjacent to the first ridge 41 of the inner layer C is specified. Specifically, a straight line b is drawn along the other side, and an end point near the first ridge 41 in a portion where the straight line b and the contour line of the inner layer C overlap each other is specified, and the end point is set to the boundary point B.

Subsequently, a line segment c1 connecting the boundary point A and the boundary point B is drawn, and a perpendicular bisector c2 of the line segment c1 is drawn. A point at which the perpendicular bisector c2 and the first ridge 41 of the inner layer C intersect each other is specified as an intersection point Q.

Subsequently, a circle passing through the boundary point A, the boundary point B and the intersection point Q is drawn, and a distance between a center O of the drawn circle and an arc (that is, the radius of the circle) is measured. The distance is the curvature radius r1 of the first ridge 41.

Although the detailed description is omitted here, the curvature radius r2 of the second ridge 42 of the inner layer C, the curvature radius r3 of the third ridge 51 and the curvature radius r4 of the fourth ridge 52 of the laminated body 10 may be measured by the same or substantially the same technique as the method of measuring the curvature radius r1 of the first ridge 41 of the inner layer C.

Although the detailed description is omitted here, the curvature radii R1 to R4 of the corners of the first exposed portion 31 in the first extended region DR1 and the curvature radii R5 to R8 of the corners of the second exposed portion 32 in the second extended region DR2 may also be measured by the same or substantially the same technique as the method of measuring the curvature radius r1 of the first ridge 41 of the inner layer C.

However, the first exposed portion 31 and the second exposed portion 32 are covered with the first external electrode 21 and the second external electrode 22, respectively. For this reason, in order to measure the curvature radii R1 to R8, it is necessary to remove the first external electrode 21 and the second external electrode 22 to expose the laminated body 10 in the portion including the first exposed portion 31 and the second exposed portion 32. As the method, a technique in which the first external electrode 21 and the second external electrode 22 are polished with water-resistant abrasive paper while the multilayer ceramic capacitor is fixed and immersed in water is preferably used. Consequently, the surface of the laminated body 10 in the portion including the first exposed portion 31 and the second exposed portion 32 are exposed.

In the preferred embodiments of the present invention described above, by way of example, the covering ceramic green sheet is bonded to the soft laminating element. Alternatively, the ceramic slurry may be applied onto the outer surface of the soft laminating element and cured.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a laminated body including a plurality of dielectric layers and a plurality of internal electrode layers that are alternately laminated in a width direction, the laminated body including a first side surface and a second side surface that are opposed to each other in the width direction, a top surface and a bottom surface that are opposed to each other in a height direction orthogonal or substantially orthogonal to the width direction, and a first end surface and a second end surface that are opposed to each other in a length direction orthogonal or substantially orthogonal to both the width direction and the height direction;
a first external electrode provided in a portion of the bottom surface on a side of the first end surface; and
a second external electrode provided in a portion of the bottom surface on a side of the second end surface; wherein
the plurality of internal electrode layers include a plurality of first internal electrode layers connected to the first external electrode and a plurality of second internal electrode layers connected to the second external electrode;
each of the plurality of first internal electrode layers includes a first opposing portion opposed to the plurality of second internal electrode layers in the width direction and a first extended portion connecting the first opposing portion and the first external electrode;
each of the plurality of second internal electrode layers includes a second opposing portion opposed to the plurality of first internal electrode layers in the width direction and a second extended portion connecting the second opposing portion and the second external electrode;
the laminated body includes at least:
an inner layer in which electrostatic capacitance is generated due to the first opposing portion and the second opposing portion being laminated in the width direction;
an upper margin located on a side of the top surface with respect to the inner layer in the height direction;
a lower margin located on a side of the bottom surface with respect to the inner layer in the height direction;
a first side margin located on a side of the first side surface with respect to the inner layer in the width direction;
a second side margin located on a side of the second side surface with respect to the inner layer in the width direction;
a first end margin located on a side of the first end surface with respect to the inner layer in the length direction; and
a second end margin located on a side of the second end surface with respect to the inner layer in the length direction;
a ridge located on a side of the first end surface of the inner layer of ridges located on a side of the top surface of the inner layer is a first ridge;
a ridge located on a side of the second end surface of the inner layer of the ridges located on the side of the top surface of the inner layer is a second ridge;
conditions of r1≤50 μm and r2≤50 μm are satisfied, when r1 is a curvature radius of the first ridge on a plane that is parallel or substantially parallel to both the height direction and the length direction and that includes a center position of the inner layer, and r2 is a curvature radius of the second ridge on the plane that is parallel or substantially parallel to both the height direction and the length direction and that includes the center position of the inner layer;

the lower margin includes:
   a first extended region defined by locating the first extended portion of each of the plurality of first internal electrode layers at a portion on the first end surface side of the lower margin; and
   a second extended region defined by locating the second extended portion of each of the plurality of second internal electrode layers at a portion on the second end surface side of the lower margin;

an outer shape of a first exposed portion that is exposed on the bottom surface and is defined by an exposed portion of the first extended region is rectangular or substantially rectangular;

an outer shape of a second exposed portion that is exposed on the bottom surface and is defined by an exposed portion of the second extended region is rectangular or substantially rectangular;

a condition of R1<R2 is satisfied, when R1 is a curvature radius of a first corner located on a side of the first end surface and a side of the first side surface of the first exposed portion, and R2 is a curvature radius of a second corner located on a side of the second end surface and a side of the first side surface of the first exposed portion;

a condition of R3<R4 is satisfied, when R3 is a curvature radius of a third corner located on a side of the first end surface and a side of the second side surface of the first exposed portion, and R4 is a curvature radius of a fourth corner located on a side of the second end surface and a side of the second side surface of the first exposed portion;

a condition of R5<R6 is satisfied, when R5 is a curvature radius of a fifth corner located on a side of the second end surface and a side of the first side surface of the second exposed portion, and R6 is a curvature radius of a sixth corner located on a side of the first end surface and a side of the first side surface of the second exposed portion; and a condition of R7<R8 is satisfied, when R7 is a curvature radius of a seventh corner located on a side of the second end surface and a side of the second side surface of the second exposed portion, and R8 is a curvature radius of an eighth corner located on a side of the first end surface and a side of the second side surface of the second exposed portion.

2. The multilayer ceramic capacitor according to claim 1, wherein
   a ridge of the laminated body connecting the top surface and the first end surface is a third ridge, and a ridge of the laminated body connecting the top surface and the second end surface is a fourth ridge; and
   conditions of r3≤50 μm and r4≤50 μm are satisfied, when r3 is a curvature radius of the third ridge on the plane that is parallel or substantially parallel to both the height direction and the length direction and that includes the center position of the inner layer, and r4 is a curvature radius of the fourth ridge on the plane that is parallel or substantially parallel to both the height direction and the length direction and that includes the center position of the inner layer.

3. The multilayer ceramic capacitor according to claim 1, wherein
   the first external electrode includes a plating film directly covering the first exposed portion; and
   the second external electrode includes a plating film directly covering the second exposed portion.

4. The multilayer ceramic capacitor according to claim 1, wherein
   a condition of L1C≤20 μm is satisfied, when L1C is a dimension of the first end margin in the length direction in a central portion in the height direction of the first end margin on the plane that is parallel or substantially parallel to both the height direction and the length direction and that includes the center position of the inner layer;
   a condition of L2C≤20 μm is satisfied, when L2C is a dimension of the second end margin in the length direction in a central portion in the height direction of the second end margin on the plane that is parallel or substantially parallel to both the height direction and the length direction and that includes the center position of the inner layer; and
   a condition of H1C≤20 μm is satisfied, when H1C is a dimension of the upper margin in the height direction in a central portion in the length direction of the upper margin on the plane that is parallel or substantially parallel to both the height direction and the length direction and that includes the center position of the inner layer.

5. The multilayer ceramic capacitor according to claim 1, wherein
   a condition of (L1A-L1B)/L1B≤0.2 is satisfied, when L1A and L1B are defined respectively as a maximum value and a minimum value of a dimension of the first end margin in the length direction on the plane that is parallel or substantially parallel to both the height direction and the length direction and that includes the central position of the inner layer;
   a condition of (L2A-L2B)/L2B≤0.2 is satisfied, when L2A and L2B are defined respectively as a maximum value and a minimum value of the dimension of the second end margin in the length direction on the plane that is parallel or substantially parallel to both the height direction and the length direction and that includes the central position of the inner layer, and
   a condition of (H1A-H1B)/H1B≤0.2 is satisfied, when H1A and H1B are defined respectively as a maximum value and a minimum value of the dimension of the upper margin in the height direction on the plane that is parallel or substantially parallel to both the height direction and the length direction and that includes the central position of the inner layer.

6. The multilayer ceramic capacitor according to claim 1, wherein when H0 is a maximum outer dimension in the height direction, and W0 is a maximum outer dimension in the width direction, a condition of (½)×W0≤H0≤W0 is satisfied.

7. The multilayer ceramic capacitor according to claim 1, wherein the multilayer ceramic capacitor is about 1.6 mm in length×about 0.8 mm in width, and has a capacitance greater than or equal to about 100.6 μF.

8. The multilayer ceramic capacitor according to claim 1, wherein the multilayer ceramic capacitor is about 1.0 mm in length×about 0.5 mm in width, and has a capacitance greater than or equal to about 30.6 μF.

9. The multilayer ceramic capacitor according to claim 1, wherein the multilayer ceramic capacitor is about 0.6 mm in length×about 0.3 mm in width, and has a capacitance greater than or equal to about 4.86 µF.

10. The multilayer ceramic capacitor according to claim 1, wherein the multilayer ceramic capacitor is about 0.4 mm in length×about 0.2 mm in width, and has a capacitance greater than or equal to about 0.69 µF.

11. A method for manufacturing the multilayer ceramic capacitor according to claim 1, the method comprising the steps of:
preparing a soft laminating element formed by alternately laminating the plurality of dielectric layers and the plurality of internal electrode layers in the width direction, exposing the plurality of internal electrode layers on an outer surface on a side of the first end surface to be located on the side of the first end surface of the laminated body, exposing the plurality of internal electrode layers on an outer surface on a side of the second end surface to be located on the side of the second end surface of the laminated body, exposing the plurality of internal electrode layers on an outer surface on a side of the top surface to be located on the side of the top surface of the laminated body, and exposing the plurality of internal electrode layers on an outer surface on a side of the bottom surface to define the bottom surface of the laminated body;
preparing a soft laminated body by providing a covering dielectric layer on each of the outer surface on the side of the first end surface of the soft laminating element, the outer surface on the side of the second end surface of the soft laminating element, and the outer surface on the side of the top surface of the laminating element; and
obtaining the laminated body by firing the soft laminated body.

12. The method according to claim 11, wherein
a ridge of the laminated body connecting the top surface and the first end surface is a third ridge, and a ridge of the laminated body connecting the top surface and the second end surface is a fourth ridge; and
conditions of r3≤50 µm and r4≤50 µm are satisfied, when r3 is a curvature radius of the third ridge on the plane that is parallel or substantially parallel to both the height direction and the length direction and that includes the center position of the inner layer, and r4 is a curvature radius of the fourth ridge on the plane that is parallel or substantially parallel to both the height direction and the length direction and that includes the center position of the inner layer.

13. The method according to claim 11, wherein
the first external electrode includes a plating film directly covering the first exposed portion; and
the second external electrode includes a plating film directly covering the second exposed portion.

14. The method according to claim 11, wherein
a condition of L1C≤20 µm is satisfied, when L1C is a dimension of the first end margin in the length direction in a central portion in the height direction of the first end margin on the plane that is parallel or substantially parallel to both the height direction and the length direction and that includes the center position of the inner layer;
a condition of L2C≤20 µm is satisfied, when L2C is a dimension of the second end margin in the length direction in a central portion in the height direction of the second end margin on the plane that is parallel or substantially parallel to both the height direction and the length direction and that includes the center position of the inner layer; and
a condition of H1C≤20 µm is satisfied, when H1C is a dimension of the upper margin in the height direction in a central portion in the length direction of the upper margin on the plane that is parallel or substantially parallel to both the height direction and the length direction and that includes the center position of the inner layer.

15. The method according to claim 11, wherein
a condition of (L1A-L1B)/L1B≤0.2 is satisfied, when L1A and L1B are defined respectively as a maximum value and a minimum value of a dimension of the first end margin in the length direction on the plane that is parallel or substantially parallel to both the height direction and the length direction and that includes the central position of the inner layer;
a condition of (L2A-L2B)/L2B≤0.2 is satisfied, when L2A and L2B are defined respectively as a maximum value and a minimum value of the dimension of the second end margin in the length direction on the plane that is parallel or substantially parallel to both the height direction and the length direction and that includes the central position of the inner layer; and
a condition of (H1A-H1B)/H1B≤0.2 is satisfied, when H1A and H1B are defined respectively as a maximum value and a minimum value of the dimension of the upper margin in the height direction on the plane that is parallel or substantially parallel to both the height direction and the length direction and that includes the central position of the inner layer.

16. The method according to claim 11, wherein when H0 is a maximum outer dimension in the height direction, and W0 is a maximum outer dimension in the width direction, a condition (½)×W0≤H0≤W0 is satisfied.

17. The method according to claim 11, wherein the multilayer ceramic capacitor is formed to have a size about 1.6 mm in length and about 0.8 mm in width, and a capacitance greater than or equal to about 100.6 µF.

18. The method according to claim 11, wherein the multilayer ceramic capacitor is formed to have a size of about 1.0 mm in length and about 0.5 mm in width, and a capacitance greater than or equal to about 30.6 µF.

* * * * *